US011562172B2

(12) United States Patent
Martin et al.

(10) Patent No.: US 11,562,172 B2
(45) Date of Patent: Jan. 24, 2023

(54) CONFIDENCE-DRIVEN WORKFLOW ORCHESTRATOR FOR DATA LABELING

(71) Applicant: Alegion, Inc., Austin, TX (US)

(72) Inventors: Cheryl Elizabeth Martin, Austin, TX (US); Ryan Michael McKay, Austin, TX (US); Fountain L. Ray, III, Austin, TX (US)

(73) Assignee: ALEGION, INC., Austin, TX (US)

( * ) Notice: Subject to any disclaimer, the term of this patent is extended or adjusted under 35 U.S.C. 154(b) by 231 days.

(21) Appl. No.: 16/989,666

(22) Filed: Aug. 10, 2020

(65) Prior Publication Data

US 2021/0042577 A1 Feb. 11, 2021

Related U.S. Application Data

(60) Provisional application No. 62/884,512, filed on Aug. 8, 2019.

(51) Int. Cl.
  *G06V 20/10* (2022.01)
  *G06K 9/62* (2022.01)
  (Continued)

(52) U.S. Cl.
  CPC .......... *G06K 9/6256* (2013.01); *G06F 17/18* (2013.01); *G06K 9/623* (2013.01); *G06K 9/6298* (2013.01); *G06N 20/00* (2019.01)

(58) Field of Classification Search
  CPC ..... G06K 9/6255; G06V 30/242; G06F 16/58
  See application file for complete search history.

(56) References Cited

U.S. PATENT DOCUMENTS

| 8,542,950 B2* | 9/2013 | Berg | G06F 16/583 |
| | | | 382/220 |
| 8,774,515 B2* | 7/2014 | Mensink | G06V 10/764 |
| | | | 382/128 |

(Continued)

FOREIGN PATENT DOCUMENTS

WO    WO 2017134519    8/2017

OTHER PUBLICATIONS

International Search Report and Written Opinion for International Patent Application No.
(Continued)

*Primary Examiner* — Yosef Kassa
(74) *Attorney, Agent, or Firm* — Sprinkle IP Law Group

(57) ABSTRACT

One embodiment includes a computer-implemented data labeling platform. The platform provides a confidence-driven workflow (CDW) executable to receive and process labeling requests to label data items. The CDW comprises a set of executable labelers, each labeler in having a dynamically modeled confidence range. The execution path for processing a labeling request to label a data item is dynamically determined. Dynamically determining the execution path comprises dynamically determining a bounded number of candidate paths through the set of labelers using dynamically calculated cost and confidence metrics for the labelers in the set of labelers to estimate a probability of each candidate path to satisfy a set of constraints on cost and final result confidence, selecting a candidate path that minimizes cost for a specified confidence from the candidate paths as a selected path, executing a next labeler consultation according to the selected path to label the data item, and dynamically re-determining the remaining execution path using calculated results arising from executing the completed path steps.

24 Claims, 14 Drawing Sheets

(51) Int. Cl.
*G06F 17/18* (2006.01)
*G06N 20/00* (2019.01)

(56) References Cited

U.S. PATENT DOCUMENTS

| | | | |
|---|---|---|---|
| 8,799,288 B2* | 8/2014 | Holzgrafe | G06F 16/434 707/738 |
| 8,873,845 B2* | 10/2014 | Wang | G06F 16/5838 382/165 |
| 9,082,047 B2* | 7/2015 | Marchesotti | G06V 20/35 |
| 9,280,561 B2* | 3/2016 | Li | G06V 30/1914 |
| 9,600,496 B1* | 3/2017 | Ovsjanikov | G06F 16/532 |
| 2011/0191271 A1 | 8/2011 | Baker | |
| 2014/0304197 A1 | 10/2014 | Jaiswal | |
| 2015/0356457 A1 | 12/2015 | Ghosh | |
| 2016/0132787 A1 | 5/2016 | Drevo | |

OTHER PUBLICATIONS

Hessam Bagherinezhad, et al., "Label Refinery: Improving ImageNet Classification through Label Progression", retrieved from <<https://arxiv.org/pdf/1805.02641.pdf>>, May 7, 2018, 16 pgs.

International Search Report and Written Opinion for International Patent Application No. PCT/US2020/066133, dated Mar. 24, 2021, 11 pgs.

* cited by examiner

CONFIDENCE-DRIVEN WORKFLOW ORCHESTRATOR FOR DATA LABELING

RELATED APPLICATIONS

This application claims the benefit of priority under 35 U.S.C. § 119(e) to U.S. Provisional Patent Application No. 62/884,512, entitled "Confidence-Driven Workflow Orchestrator," filed Aug. 8, 2019, which is hereby fully incorporated by reference herein for all purposes.

TECHNICAL FIELD

Embodiments relate to computer systems and computer implemented methods for labeling data. Even more particularly, embodiments relate to systems and methods for labeling data using a dynamically determined execution path through one or more labelers.

BACKGROUND

Machine learning (ML) techniques enable a machine to learn how to automatically and accurately make predictions based on historical observation. Training an ML algorithm involves feeding the ML algorithm with training data. For example, training an ML algorithm for classification involves feeding the ML algorithm to build an ML model. For example, training an ML algorithm to classify data may involve training the ML algorithm with training data to build an ML model for mapping an input space to labels in a discrete label set. The accuracy of an ML model often depends on the quantity and quality of the training data used to build the ML model.

An entire industry has developed around the preparation and labeling of training data. A number of companies provide platforms through which example data is distributed to human users for manual labelling. The customer may be charged for the labeling services based on the human expertise required to label the data, the number of rounds of human review used to ensure the accuracy of the labelled data and other factors. The need for people to label the training data can have significant costs, both in terms of time and money. A new paradigm for labeling data is therefore required.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

SUMMARY

Figure 1:
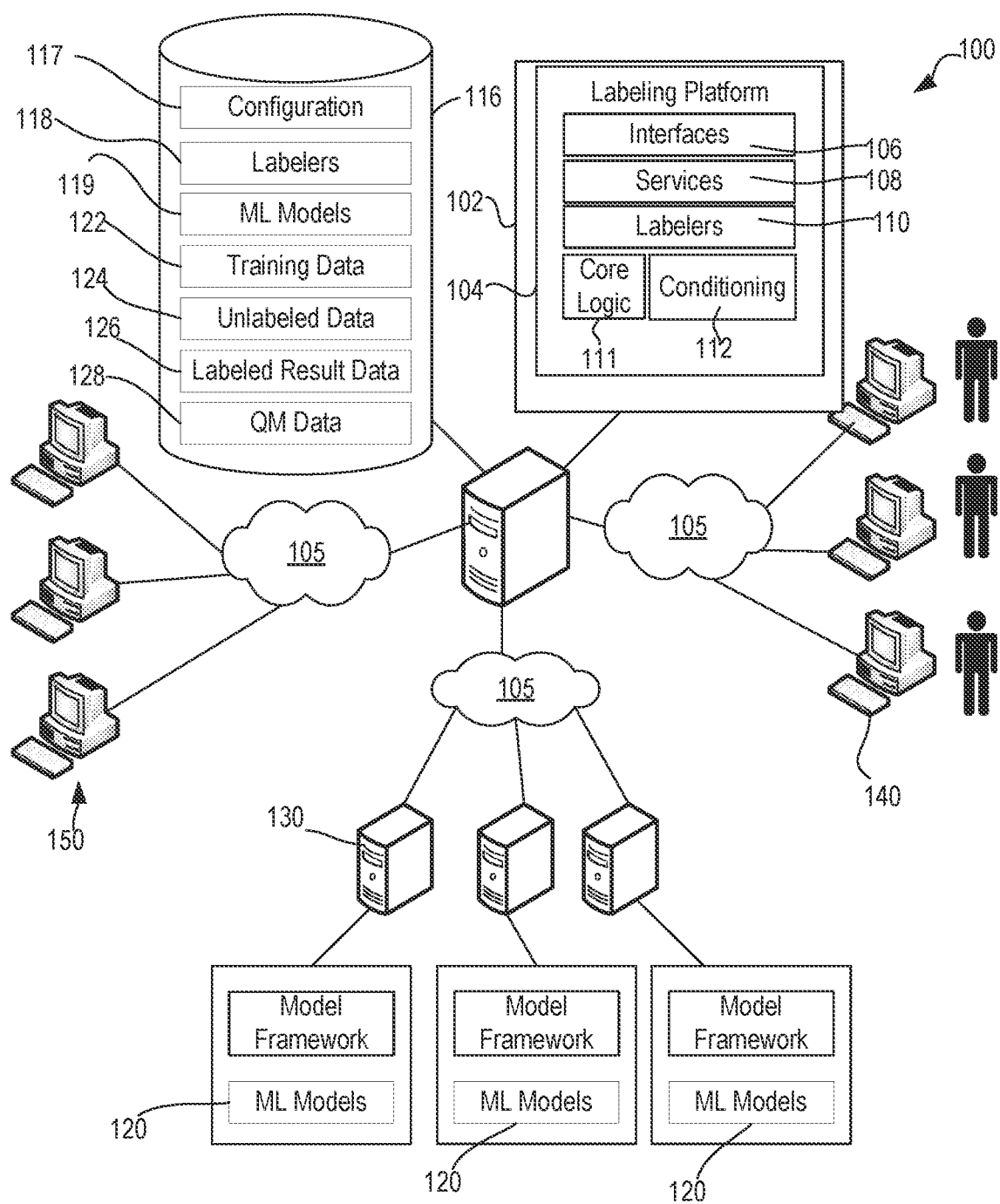
FIG. 1 is a diagrammatic representation of one embodiment of a labeling environment.

As mentioned above, data labeling often relies on human specialists to label data. However, such data labeling is time consuming and expensive. Embodiments described herein provide mechanisms that can combine machine learning based data labeling with human specialist data labeling. As the machine learning component becomes more accurate, the labeling platform can automatically begin relying on the machine learning component more heavily, for example routing requests to human specialists when the machine learning component produces a low confidence result.

In accordance with one aspect of the present disclosure, a confidence-driven workflow (CDW) is provided. A CDW encapsulates a collection of labelers which are consulted in sequence, and their individual results are incorporated into an overall result, until a configured confidence threshold for an overall result is reached. For example, the collection of labelers can include machine learning labelers, and human labelers, or combinations thereof. The constituent labelers are not directly linked, and the execution path is dynamically determined based, for example, on confidence and cost constraint configuration. The order of consultation generally proceeds from least expensive labeler to most expensive labeler. In some cases, a given constituent labeler may be consulted more than once in the execution path.

The labelers in a workflow may act as interfaces to labeler instances that are continuously monitored and scored based on the results produced by the labeler instances. The scores for the labeler instances behind a labeler can be used to dynamically determine a confidence range for the labeler and the confidence ranges for the labelers can be used in dynamic path determination. More particularly, the dynamic path determination mechanism can use the dynamically modeled confidence ranges for the labelers in the CDW to determine a priori confidence estimates for one or more paths and identify candidate paths that are predicted to meet cost and confidence constraints for a labeling request. The dynamic path determination mechanism can select a candidate path based, for example, on minimizing cost or other criteria. The CDW executes the next labeler consultation for the labeling request based on the selected path—for example, routes the labeling request to the next labeler based on the selected path.

As stated above, selection of a candidate path is based on expected cost and impact on overall result confidence. The actual cost and impact on overall result confidence may not be known until the individual labeler has been consulted, and its result obtained and incorporated into the overall result by the CDW. According to one embodiment, if the labeled result returned by a labeler does not match the cost and/or confidence expectations, the CDW can dynamically redetermine candidate paths. This redetermination can incorporate the accrued cost and overall result confidence estimate, the configured cost and confidence constraints, and the most recent available cost and confidence models of the CDW constituent labelers.

It will be appreciated that the expectations for any given point in an execution path may be different than the overall all expectations for the execution path. After a step in the path, the labeling platform will have more information about the actual confidence and costs so far in the execution path and a redetermination of candidate paths can be performed help optimize the path from the current point in the execution path forward, whether or not the expectations for the current point in the path have been met. In some embodiment, then, the (re)determination of candidate paths can occur for every step in the execution path, whether or not the expectations for that point have been met (e.g., until the overall all expectations for the execution path are met).

Dynamic path determination can account for the fact that the confidence in individual labelers may change. For example, as more data is labeled, a machine learning labeler can be retrained, and the quality of the machine learning labeler goes up. Consequently, the dynamically determined execution paths may increasingly terminate after a single consultation with the machine learning labeler, driving down the temporal and monetary costs of labeling by reducing reliance on human specialists.

One embodiment includes a computer program product comprising a non-transitory, computer-readable medium storing thereon a set of computer-executable instructions. The set of computer executable instructions can include instructions for providing a CDW comprising a set of labelers. Each labeler in the set of labelers can comprise executable code and have a dynamically modeled confidence range. The set of computer instructions can further comprise instructions for dynamically determining an execution path for a labeling request to label a data item, wherein dynamically determining the execution path comprises dynamically determining a bounded number of candidate paths through the set of labelers using dynamically calculated cost and confidence metrics for the labelers in the set of labelers to estimate a probability of each candidate path to satisfy a set of constraints on cost and a final result confidence. The set of computer instructions can further comprise instructions for candidate path from the candidate paths as a selected path. The next labeler consultation can be executed according to the selected path. For example, the labeling request can be routed to a next labeler based on the selected path.

Embodiments can further include instructions for receiving a labeled result from the selected labeler and determining a confidence estimate for the labeled result. The labeled result output of the selected labeler may be incorporated into an overall result. The overall result may be output as the final result for the CDW if the confidence estimate meets the constraint for the final result confidence. If the estimated confidence in the overall result does not meet the target confidence threshold, the labeling request may be routed to a next labeler from the set of labelers according to a selected path.

In another embodiment, if the estimated confidence in the labeled result output by the labeler does not meet the target confidence threshold, the next labeler consultation can be redetermined. For example, a new set of candidate paths can be redetermined using, for example, the accrued cost and result confidence estimate based on prior labeler consultations in the execution path and the confidence metrics for the labelers in the set of labelers to estimate a probability of each candidate path to satisfy a set of constraints on cost and final result confidence. A candidate path can be selected from the candidate paths and a next consultation executed according to the selected path.

If the confidence estimate for the overall labeled result does not meet the target confidence threshold, an exception that the labeling request cannot be completed within the cost and confidence constraints can be reported. For example, an exception can be reported if the confidence estimate for the overall labeled result does not meet the target confidence threshold and there is no viable path to meet the cost and final result confidence constraints.

Embodiments can include instructions for continually monitoring and scoring a plurality of labeler instances to generate labeler instance scores for the plurality of labeler instances. Scoring a labeler instance may include determining an accuracy of the labeler instance based on a correctness of a set labeled results produced by the labeler instance.

Embodiments can include instructions for updating the dynamically modeled confidence range for each labeler in the set of labelers. According to one embodiment, updating the dynamically modeled confidence range for a labeler from the set of labelers comprises determining a set of labeler instance scores associated with a pool of labeler instances represented by the labeler and aggregating the set of labeler instance scores to generate the dynamically modeled confidence range for the labeler.

Each labeler instance can have an associated labeler instance cost (e.g., costs in one or more dimensions) and each labeler can have an associated labeler cost. According to one embodiment, the associated labeler cost for each labeler is a statistical description of the associated labeler instance costs of the one or more labeler instances represented by that labeler.

According to one embodiment, a labeler may route labeling requests to labeler instances based on scores. A labeler can receive an individual labeler confidence constraint for a labeling request; determine a labeler instance of the one or more labeler instances represented by that labeler that has a score that meets the individual labeler confidence constraint; and route the first labeling request to the first labeler instance.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments of the present disclosure provide systems and methods for a confidence-driven workflow (CDW). A CDW encapsulates a set of constituent labelers having various associated confidences and costs. The CDW dynamically determines an execution path through one or more labelers of the CDW based, for example, on cost and confidence constraints. More particularly, in accordance with one aspect of the present disclosure, the CDW dynamically determines a cost-optimized execution path to meet a target confidence threshold for a labeling request.

FIG. 1 is a diagrammatic representation of one embodiment of an environment 100 for labeling data. In the illustrated embodiment, environment 100 comprises a labeling platform system 102 coupled through network 105 to various computing devices. Labeling platform system 102 provides a labeling platform 104 for labeling data. Network 105 comprises, for example, a wireless or wireline communication network, the Internet or wide area network (WAN), a local area network (LAN), or any other type of communications link.

Labeling platform 104 executes on a computer—for example one or more servers—with one or more processing units (CPUs, GPUs, and/or other processing units) executing instructions embodied on one or more computer readable media where the instructions are configured to perform at least some of the functionality associated with embodiments of the present invention. These applications may include one or more applications (instructions embodied on a computer readable media) one or more interfaces 106 utilized by labeling platform 104 to gather data from or provide data to ML platform systems 130, human labeler computer systems 140, client computer systems 150, or other computer systems. It will be understood that the particular interface 106 utilized in a given context may depend on the functionality being implemented by labeling platform 104, the type of network 105 utilized to communicate with any particular entity, the type of data to be obtained or presented, the time interval at which data is obtained from the entities, the types of systems utilized at the various entities, etc. Thus, these interfaces may include, for example web pages, web services, a data entry or database application to which data can be entered or otherwise accessed by an operator, APIs, libraries or other type of interface which it is desired to be utilized in a particular context.

Labeling platform 104 may comprise a number of services 108 for configuration, receiving input data to be labeled, outputting labeled data, executing labelers, implementing confidence driven workflows (CDW), scoring labelers, dispatching tasks and/or implementing other functionality. Labeling platform 104 further includes labeler core logic 111 for multiple types of labelers and conditioning components 112 for various types of data conditioning. As discussed below, labeler core logic 111 can be combined with conditioning components 112 to create labelers 110.

Labeling platform 104 utilizes a data store 116 operable to store obtained data, processed data determined during operation, and rules/models that may be applied to obtained data or processed data to generate further processed data. Data store 116 may comprise one or more databases, file systems, combinations thereof or other data stores. In one embodiment, data store 116 includes configuration data 117, which may include a wide variety of configuration data, including but not limited to configuration data for configuring a directed graph, labelers 110, and other aspects of labeling platform 104. Labeling platform 104 also stores data to persist labelers 110 (labeler definitions 118), data to persist machine learning (ML) models 120 (ML model data 119), training data 122 used to train ML models 120, unlabeled data 124 to be labeled, quality metrics (QM) data 128 (e.g., confidence data) and other data.

Labeling platform 104 can distribute data to human users to be labeled and receive labeling results. To this end, environment 100 also comprises human labeler computer systems 140 that provide user interfaces (UI) to present data to be labeled to human users and receive inputs indicating the labels selected for the data by the human users.

Labeling platform 104 may also leverage ML models 120 to label data. Labeling platform 104 may implement its own ML platform or leverage external or third-party ML platforms, such as commercially available ML platforms hosted on ML platform systems 130. As such, data labeling environment 100 includes one or more ML platforms in which ML models 120 may be created, trained, and deployed. There are many platforms, frameworks, and algorithms available for ML model training and inference. By way of example, but not limitation, an ML model may be trained in a DOCKER container (e.g., a DOCKER container containing libraries to train a model, or on a platform such as AMAZON SAGEMAKER, GOOGLE AUTOML, KUBEFLOW (SAGEMAKER from Amazon Technologies, Inc., AUTOML from Google, DOCKER by Docker, Inc.). In addition, there are various model frameworks that can be used (e.g., TENSORFLOW by Google, PyTorch, and MXNet). Further there are many ML algorithms (e.g. K-Means, Logistic Regression, Support Vector Machines, Bayesian Algorithms, Perceptron, Convolutional Neural Networks). Labeling platform 104 can send data to be labeled to one or more labeling platforms so that data can be labeled by one or more ML models 120.

Client computer systems 150 provide interfaces to allow users, such as agents or customers of the entity that provides labeling platform system 102, to create use cases and provide input data, such as submit unlabeled data 124 to be labeled. According to one embodiment, a use case is a set of configuration information for configuring labeling platform 104 to process unlabeled data 124. Even more particularly, a use case may be a configuration for a processing graph for processing of unlabeled data 124. A use case may specify, for example, an endpoint for uploading records, an endpoint from which labelled records may be downloaded, an endpoint from which exceptions may be downloaded, a list of output labels, characteristics of the unlabeled data (e.g., media characteristics, such as size, format, color space), pipelines (e.g., data validation and preparation pipelines), machine learning characteristics (e.g., ML model types, model layer configuration, active learning configuration, training data configuration), confidence driven workflow configurations or other configurations. A confidence-driven workflow configuration may include a variety of configuration data for a confidence-driven workflow including, but not limited to, a target confidence threshold, constituent labelers, whether each constituent labeler are considered "open" or "blind" judgement labelers, the number of times a labeling request may be resubmitted to the same labeler as part of a CDW, human specialist workforces to use, task templates for human input, cost and quality constraints or other information. Labeling platform 104 may support a wide array of use cases.

In operation, labeling platform 104 receives a set of data to be labeled and indicators of a set of labelers 110 available to use to label the data. In accordance with one embodiment, labeling platform 104 implements a use case to label the data. For example, the use case may point to a data source (such as a database, file, cloud computing container, etc.) and specify configurations for labelers to use to label the data. Labeling platform 104 executes a directed graph of labelers 110 (e.g., to implement the use case) to label the data. In some cases, the labelers are executed in a CDW for a use case to label the data and produce labeled result data 126, where the workflow incorporates one or more ML models and/or human users to label the data. The CDW may itself be implemented as a directed graph.

During execution of the workflow, the same data item to be labeled (e.g., image, video, word, document, or other discrete unit to be labeled) is sent to one or more labelers. The data item may be sent to one or more ML labeling platforms to be processed by one or more ML models 120. In addition, or in the alternative, the data item may be sent to one or more human labeler computer systems 140 to be labeled by one or more human specialists. Based on the labels output for the data item by one or more labelers, the workflow can output a final labeled result.

The CDW can be configured to dynamically determine the execution path through the one or more labelers to meet confidence and cost constraints. The dynamic path selected can depend on confidences and costs of the one or more labelers and may be reevaluated after each consultation with a labeler in the path. The confidences in the labelers can be continuously updated (e.g., by a quality management subsystem (QMS)).

A CDW implemented by labeling platform 104 can incorporate a lower cost labeler (e.g., ML labeler or human labeler) that initially has a relatively low accuracy for domain specific data being labeled. Over time, the labeler may become more accurate, causing the confidence in the labeler to increase. For example, an ML model behind an ML labeler may be retrained or human specialists behind a human labeler may become more accurate as they gain experience labeling a certain type of data. As the confidence in labeler increases, reliance on that labeler may increase. That is, the dynamic path selection may increasingly rely on paths that route labeling requests to the low-cost labeler.

As an example, a CDW can include a generic ML image classifier in a CDW to label medical images, where the image classifier initially has a low accuracy for medical images. Over time, the image classifier can be retrained using medical images labeled by the CDW or other training data to become increasingly accurate. As the confidence in the image classifier's accuracy increases, CDW may dynamically change to rely more heavily on the ML image classifier and reduce or eliminate human involvement in labeling training data. Thus, the speed at which labeling platform 104 can label data to a requisite degree of confidence may increase over time while the cost decreases.

In some embodiments, the CDW may be used to label domain specific training data that can then be used to train machine learning models. For example, a CDW may be used to label medical images and the labeled medical images can be used as training data to train a machine learning model that is not part of the CDW or even labeling platform 104.

The basic building block of a workflow is a "labeler." A labeler takes input and enriches the input with one or more labels. Labelers (including labelers of different types) can be composed together into directed graphs as needed, such that each individual labeler solves a portion of an overall classification problem, and the results are aggregated together to form the overall labeled output. The overall labeling graph for a use case can be thought of abstractly as a single labeler, and each labeler may itself be implemented as a directed graph. There may be branches, merges, conditional logic, and loops in a directed graph. Each directed graph may include a fan-in to a single output answer or exception per input element. The method of modeling the labeling in such embodiments can be fractal. The labeling graphs implemented for particular use cases may vary, with some graphs relying exclusively on ML labelers and other graphs relying solely on human labelers.

Labeling platform 104 may include multiple types of labelers and multiple labelers of each type. Example labelers include, but are not limited to, executable code labelers, third-party hosted endpoint labelers, ML labelers, human labelers. As mentioned above, labelers may be composed together. For example, labelers may be combined into CDWs. A CDW may also be considered a type of labeler.

Figure 2:
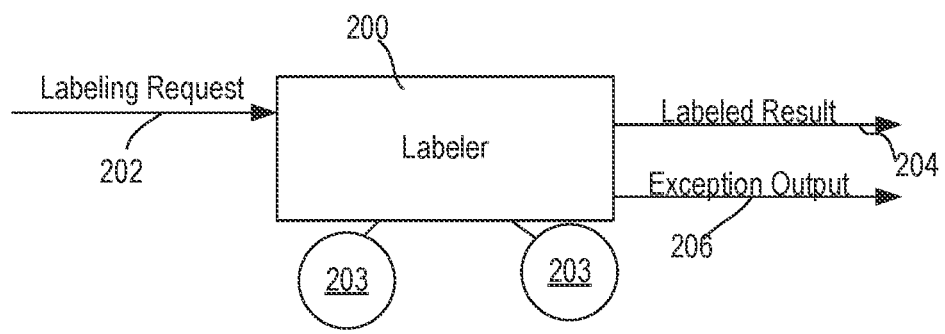
FIG. 2 is a diagrammatic representation of one embodiment of a labeler.

FIG. 2 is a high-level block diagram of a labeler 200. Input is fed to labeler 200 over an input pipe 202 and is passed through an input conditioning pipeline if one is specified for the labeler. The labeled result, which may be the result of running a (conditioned) labeling request through a labeler instance 203, is placed in an output pipe 204. The output labeled result can be passed through an output conditioning pipeline if one is specified for the labeler. Inputs that the labeler fails to label may be placed in an exception pipe 206. Some exceptions may be recoverable. Input pipe 202, output pipe 204, and exception pipe 206 can pass both data and labeling flow control. Each of these pipes can have a configurable expected data schema.

An element of input data may be considered a labeling request, which can comprise an element to be labeled or reference to the element to be labeled, such as an image or other data item to be labeled by the labeler. The labeling request may have associated flow control data, such as constraints on allowable confidence and cost, a list of labeler instances 203 acceptable to handle or not handle the request or other associated flow control information to control how the labeler 200 handles the request.

According to one embodiment, the labeled result output by labeler 200 on output pipe 204 includes the data item or reference to the data item labeled and at least one label. The label output by labeler 200 may have many forms, such as, but not limited to: a value output based on a regression model, a class label, a bounding box around an object in an image, a string of words that characterize/describe the input (e.g., "alt text" for images), an identification of segmentation (e.g., "chunking" a sentence into subject and predicate). In some cases, labeler 200 may also output a self-reported confidence measure for a label. Labeler 200 may also output various other information associated with the labeled result, such as the labeler instance that processed the labeling request.

A labeling request can be thought of as a question. For example, inputting an image to a labeler adapted for detecting tumors in images may be thought of as the question "does this image include a tumor?" A labeled result can be thought of as a judgement or an answer to a question. For example, in response to an image input into a labeler adapted to detect tumors in medical images, the labeler may tag an image as "tumor" if a tumor is detected or as "no tumor," indicating that no tumor was detected, either of which is an answer to the question "does this image include a tumor?"

Figure 3:
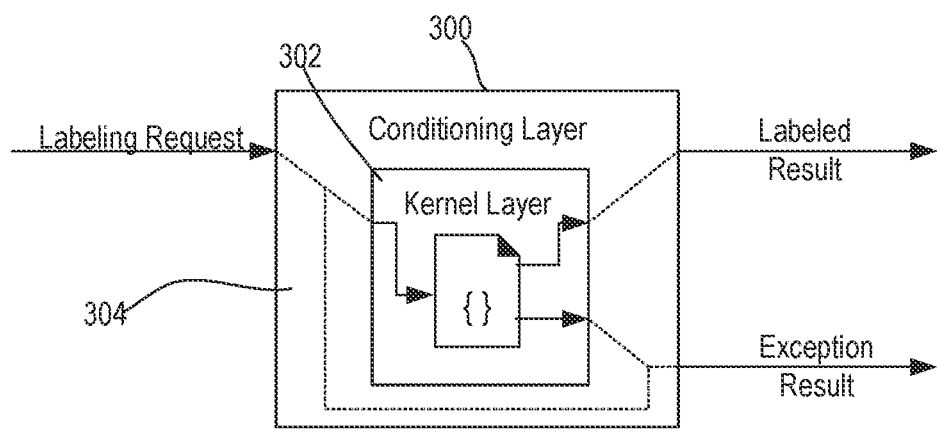
FIG. 3 is a diagrammatic representation of one embodiment of an internal structure of a labeler.

One embodiment of the general internal structure of a labeler 300 is illustrated in FIG. 3. A labeler may be considered a wrapper on executable code. In some cases, the executable code may call out to third party hosted endpoints. Configuration can specify the endpoints to use, authentication information, and other configuration information to allow the labeler to use the endpoint. In the illustrated embodiment, the labeler's kernel core logic 302 is surrounded by a conditioning layer 304, which translates input/output data from an external domain to the kernel's native data domain. As will be appreciated, different labelers may have different kernel core logic 302 and conditioning layers 304. Some types of labelers may include additional layers.

Each human labeler and ML labeler may be considered an interface to a pool of one or more labeler instances behind it. A labeler is in charge of routing labelling requests to specific labeler instances within its pool. For a human labeler, the labeler instances are individual humans working through a user interface (e.g., human specialists). For an ML labeler, the labeler instances are ML models deployed in model platforms. The kernel core logic 302 of a human labeler is configured to distribute labeling requests out to individual human specialists while the kernel core logic 302 of an ML labeler is configured to leverage an ML model to label data. The labeler instances behind a labeler may have different performance characteristics modeled by the labeling platform, including but not limited to, confidence metrics and costs (e.g., time costs and monetary costs).

Translation by conditioning layer 304 may be required because the data domain external to the kernel core logic 302 may be different than the kernel's data domain. In one embodiment, for example, the external data domain may be use-case specific and technology agnostic, while the kernel's data domain may be technology-specific and use-case agnostic. The conditioning layer 304 may also perform validation on inbound data. For example, for one use case, a solid black image may be valid for training/inferring, while for other use cases, it may not. If it is not, the conditioning layer 304 may, for example, include a filter to remove solid black images. Alternatively, it might reject such input and issue an exception output.

The conditioning layer 304 of a labeler may include input conditioning, successful output conditioning, and exception output conditioning. Each of these can be constructed by arranging conditioning components into pipelines. Conditioning components perform operations such as data transformation, filtering, and (dis)aggregation. Similar to labelers, the conditioning component may have data input pipes, data output pipes, and exception pipes.

As mentioned above, some examples of labelers include, but are not limited to, executable code labelers, third-party hosted endpoint labelers, ML labelers, human labelers, and confidence driven workflows (CDWs).

Executable code labelers package up executable code with configurable parameters to be used as executable code labelers. The configuration for an executable code labeler includes any configuration information relevant to the executable code of the labeler. Other than the generic configuration information that is common to all labelers, the configuration for an executable labeler will be specific to the code. Examples of things that could be configured include, but are not limited to: S3 bucket prefix, desired frame rate, email address to be notified, batch size.

A third-party hosted endpoint labeler can be considered a special case of an executable code labeler, where the executable code calls out to a third-party hosted endpoint. The configuration of the third-party hosted endpoint can specify which endpoint to hit (e.g., endpoint URL), auth credentials, timeout, etc.

A human labeler acts as a gateway to a human specialist workforce. A human labeler may encapsulate a collection of human specialists with similar characteristics (cost/competence/availability/etc.) as well as encapsulating the details of routing requests to the individual humans and routing their results back to the labeling system. Human labelers package the inbound labeling request with configured specialist selection rules and a task UI specification into a task.

Figure 4:
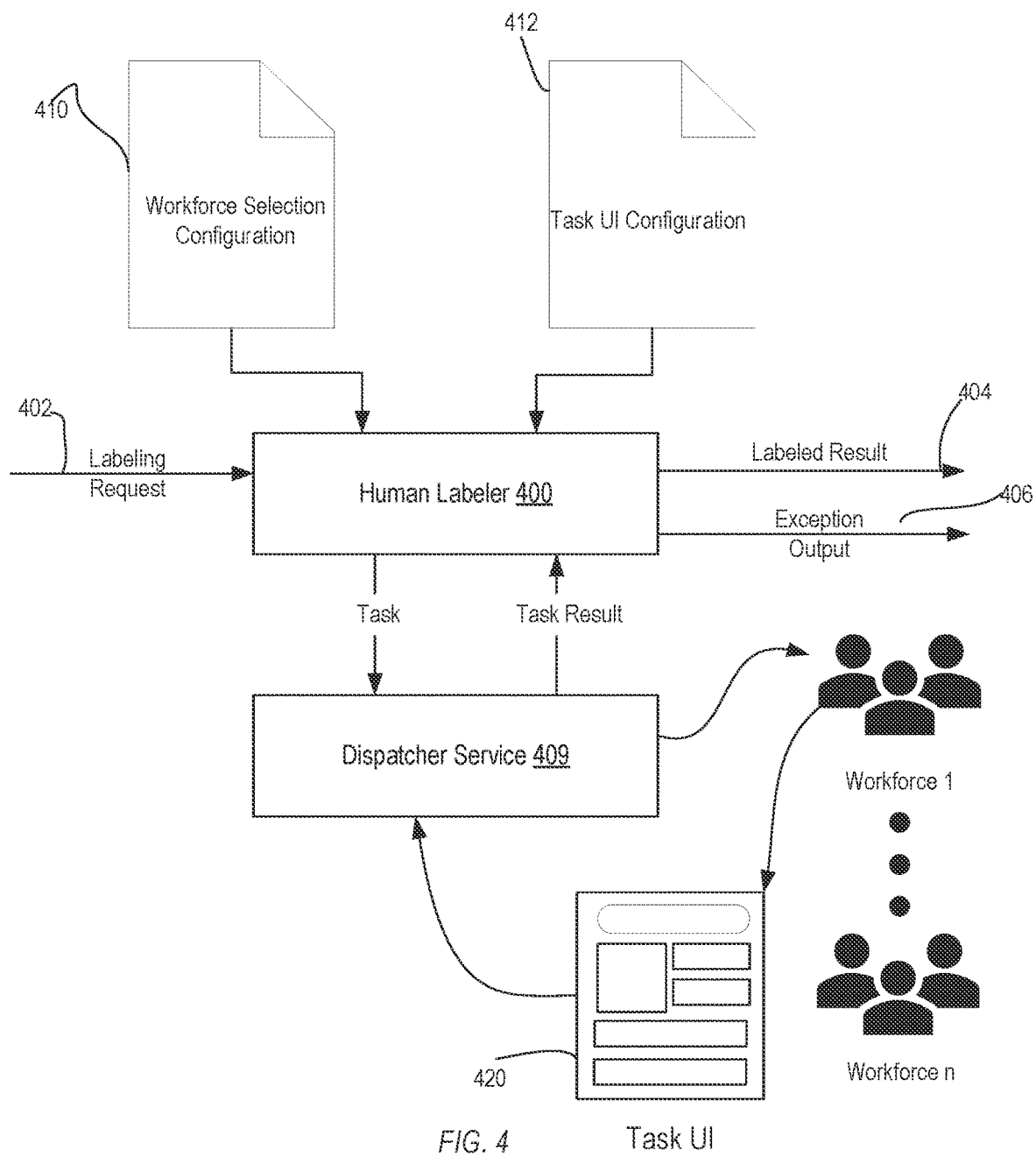
FIG. 4 is a diagrammatic representation of one embodiment of processing using a human labeler.

FIG. 4 illustrates one embodiment of processing by a human labeler 400. In the illustrated embodiment, human labeler 400 receives a labeling request on input pipe 402 and outputs a labeled result on an output pipe 404. Exceptions are output on exception pipe 406. Human labeler 400 may include kernel core logic configured to distribute labeling requests out to individual human specialists and a conditioning layer to condition one or more of labeling requests, labelled results, or exceptions.

Human labeler 400 is configured according to a workforce selection configuration 410 and a task UI configuration 412. Workforce selection configuration 410 provides criteria for selecting human specialists to which a labeling request can be routed. Workforce selection configuration 410 can include, for example, platform requirements, workforce requirements and individual specialist requirements. In some embodiments, labeling platform 104 can send tasks to human specialists over various human specialist platforms (e.g., Amazon Mechanical Turk marketplace and other platforms). Workforce selection configuration 410 can thus specify the platform(s) over which tasks for the labeler can be routed. Human specialist platforms may have designated workforces (defined groups of human specialists). Workforce selection configuration 410 can specify the defined groups of human specialists to which tasks from the labeler can be routed (i.e., groups of human labeler instances to whom labeling tasks can be routed). If a workforce is declared in the workforce selection configuration 410 for a use case, a human specialist must be a member of that workforce for tasks for human labeler 400 to be routed to that human specialist. Workforce selection configuration 410 may also specify criteria for the individual specialists to be routed a task for human labeler 400. By way of example, but not limitation, workforce selection configuration 410 can include a skill declaration that indicates the skills and minimum skill scores that individual workers (human specialists) must have to be routed labeling tasks from the labeler. A quality monitoring subsystem (QMS) may track skills/skill scores for individual human specialists.

Task UI configuration 412 specifies a task UI to use for a labeling task and the options available in the UI. According to one embodiment, a number of task templates can be defined for human labeler specialists with each task template expressing a user interface to use for presenting a labeling request to a human for labeling and receiving a label assigned by the human to the labeling request. Task UI configuration 412 can specify which template to use and the labeling options to be made available in the task UI.

When human labeler 400 receives a labeling request, human labeler 400 packages the labeling request with the workforce selection configuration 410 and task UI template configuration 412 as a labeling task and sends the task to dispatcher service 409. Dispatcher service 409 is a highly scalable long-lived service responsible for accepting tasks from many different labelers and routing them to the appropriate endpoint for human specialist access to the task. Once a worker accepts a task, labeling platform 104 (e.g., dispatcher service 409) serves the configured browser-based task UI 420, then accepts the task result from the specialist and validates it before sending it back to the labeler. The same labeling request may be submitted multiple times to a single human labeler. In some embodiments however, it is guaranteed that a labeling request is not presented to the same human specialist (human labeler instance) more than once.

Human-facing tasks can also support producing an exception result, with a reason for the exception. In some embodiments, human-facing tasks may allow a specialist to self-assess their confidence in their answer. As such, a task result may include an associated self-resulted confidence measure.

Figure 5:
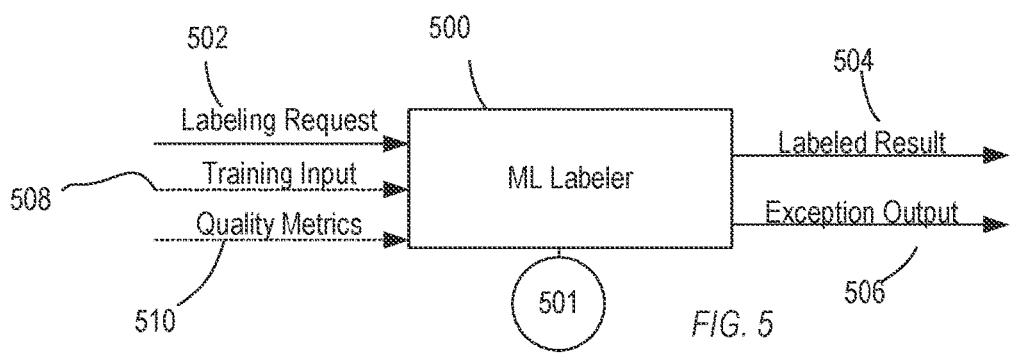
FIG. 5 is a diagrammatic representation of one embodiment of a machine learning (ML) labeler.

FIG. 5 illustrates one embodiment of an ML labeler 500. The core logic of ML labeler 500 may implement an ML model 501 or connect to an ML framework to train or utilize ML model 501 in the ML framework. In the illustrated embodiment, ML labeler 500 receives a labeling request on input pipe 502, runs the labeling request through an ML model 501—which may be considered a labeler instance—and outputs a labeled result on output pipe 504. As will be appreciated, ML model 501 may support the capability to output a self-assessed confidence for a result. The labeled result output by ML labeler 500 may thus include an associated self-assessed confidence for the result. Exceptions are output on exception pipe 506.

ML labeler 500 includes two additional input pipes, training data input pipe 508 and quality metrics pipe 510. Training data input pipe 508 may be used to receive training data for training (including retraining) of ML model 501. Quality metrics data is received over quality metrics pipe 510. Quality metrics may be used to input quality metrics data for a training flow or quality metrics data used, for example, in a CDW. Because the model used by the ML labeler can be retrained, ML labeler 500 can learn over time to perform some or all of a use case.

Training data input pipe 508 and quality metrics pipe 510 can be connected to the core logic of ML labeler 500 code (e.g., kernel core logic 302 of ML labeler 500) similar to the input pipe as illustrated in FIG. 3. ML labeler 500 may also include a conditioning layer to condition one or more of labeling requests, training data, quality metrics data, labelled results, or exceptions.

At a high level, ML training and inference can be thought of as a pipeline of five functional steps: input data acquisition, input data conditioning, training, model deployment, and model inference. According to one embodiment, the acquisition of unlabeled data for labeling and labeled data for training is handled by labeling platform 104, as opposed to within the ML labeler 500 itself. By way of example, but not limitation, the data may be passed in directly over an endpoint, streamed in via a queue like SQS or Kafka, or provided as a link to a location in a blob store. The labeler can use simple standard libraries to access the data.

Data may be transformed to prepare the data for training and/or inference. Frequently some amount of transformation will be required from raw input data to trainable/inferable data. This may include validity checking, image manipulation, aggregation, etc. As would be appreciated by those in the art, the transformations can depend on the requirements of the ML model being trained or used for inference.

Training (and retraining) is the process by which conditioned training data is converted into an executable model or a model is retrained. The output of training is an ML model that represents the best model currently producible given the available training data. It can be noted that in some embodiments, such as embodiments utilizing ensemble approaches, an ML labeler may use multiple models produced from training.

Training data enters ML labeler 500 through its training data input pipe 508. This pipe, according to one embodiment, transfers data only, not labeling flow control. The schema of the training data input pipe may be the same as the schema of output pipe 504. As such, training data may need conditioning in order to be consumable by the training process. In some embodiments, training data accumulates in a repository, but may be subject to configurable data retention rules.

In some cases, end user-provided data or a publicly available dataset may be used as a training dataset. New models can be trained as additional training data becomes available. In addition, or in the alternative, training data can come from an "oracle" labeler (e.g., an oracle ML labeler or oracle human labeler). The output of the oracle labeler is assumed to be correct, or at least the most correct to which labeling platform 104 has access for a use case.

Training data augmentation may be used to bolster and diversify the training data corpus by adding synthetic training data. This synthetic training data can be based on applying various transforms to raw training data.

There are a variety of options for triggering training. The trigger may be as simple as a certain number of training data records accumulating, or a certain percentage change therein. A training trigger may also incorporate input from a quality control subsystem. Time since last training can also be considered.

Output labels from ML labeler 500 are the result of running a conditioned label request through a deployed ML model 501 to obtain an inferred answer. This inference may not be in a form that is directly consumable by the rest of the labeling graph (as specified by the schema of output pipe 504), in which case the inference is passed through an output conditioning pipeline (e.g., in conditioning layer 304). According to one embodiment, the final labeled result output by ML labeler 500, includes the input label request, the inferred label, and a self-reported confidence measure.

Figure 6:
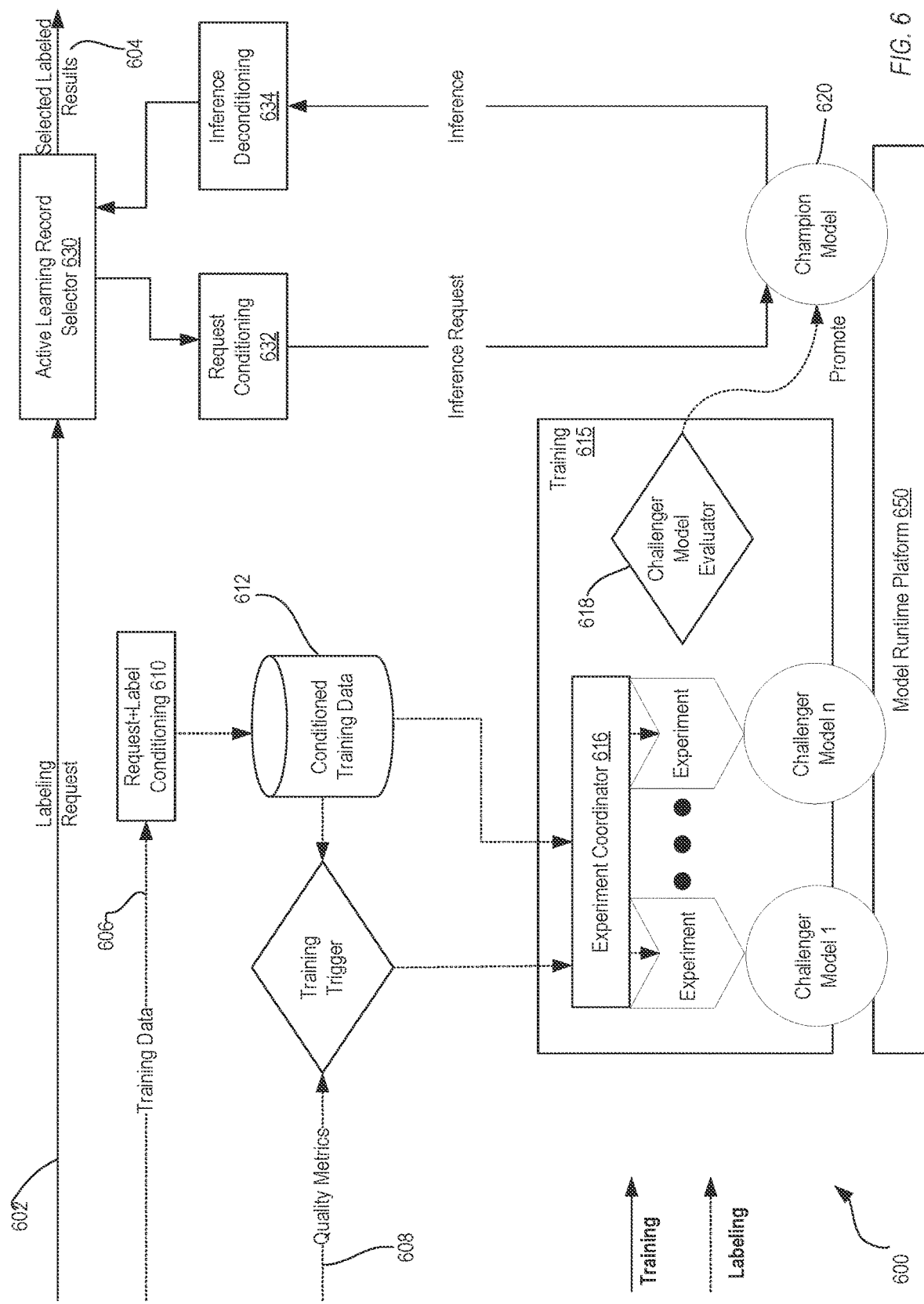
FIG. 6 is a diagrammatic representation of one embodiment of an ML labeler in more detail.

FIG. 6 is a diagrammatic representation of the functional components of one embodiment of an ML labeler 600, which may be one example of an ML labeler 500. According to one embodiment, ML labeler 600 is configured according to an ML configuration that specifies a configuration of each of the functional components.

FIG. 6 also illustrates example data labeling and training flows. In the embodiment of FIG. 6, ML labeler 600 includes input pipe 602, output pipe 604, training data input pipe 606 and quality metrics input pipe 608. To simplify the diagram, the exception pipe is not shown in FIG. 6, but as will be appreciated, if any error condition is encountered in labeler execution, it is signaled out on the exception pipe.

An ML labeler includes code to implement or utilize an ML model. In some embodiments, the ML labeler may be implemented as a wrapper for an ML model on an ML platform 650 running locally or on a remote ML platform system (e.g., an ML platform system 130). The ML labeler configuration can specify an ML algorithm to use and, based on the ML algorithm specified, labeling platform 104 configures the labeler with the code to connect to the appropriate ML platform 650 to train and use the specified ML algorithm.

An ML labeler can include a conditioning layer comprising a request conditioning pipeline to condition input labeling requests, an inference conditioning pipeline to condition labeled results and a training request and label conditioning pipeline for conditioning training data. Each conditioning pipeline, if included, may comprise one or more conditioning components. The ML labeler configuration can specify the conditioning components to be used for request conditioning, inference de-conditioning and training and request conditioning and how the components are configured (for example, can specify the size of image an image resizing component should resize to).

In the embodiment illustrated, ML labeler 600 includes a conditioning layer comprising a training request conditioning pipeline 610 for conditioning training data to produce conditioned training data 612, which is used to train one or more ML models. The conditioning layer further includes request conditioning pipeline 632 to condition input labeling requests, and an inference conditioning pipeline 634 to condition results. Labeling requests received on input pipe 602 are conditioned by request conditioning pipeline 632 and inferences (results) produced by a current active ML model are 620 are conditioned by interference (de)conditioning pipeline 634. Each conditioning pipeline, if included, may comprise one or more conditioning components as specified in the ML labeler's configuration.

ML labeler 600 includes training component 615 executable to train an ML algorithm. Training component 615 may be configured to connect to the appropriate ML platform 650 to train an ML algorithm to create or retrain an ML model. The training component 615 includes an experiment coordinator 616 that interfaces with ML platform 650 to train multiple challenger models (e.g., using various hyperparameters or other mechanisms for training multiple candidate models known or developed in the art) and a challenger model evaluator 618 that evaluates candidate ML models against each other and the current active model to determine which should be the current active model for inferring answers to labeling requests. The ML labeler configuration may further specify hyper-parameter ranges and limits to be used during training. The output is a champion ML model that represents the best model currently producible given the available training data. The training component 615 thus determines the ML model to use as the current active model for inferring answers to labeling requests.

The ML labeler configuration can specify training triggers, such that when the training component 615 detects a training trigger, the training component 615 initiates (re) training of the ML algorithm to determine a current active model. Training triggers may be based on, for example, an amount of training data received by the labeler, quality metrics received by the labeler, elapsed time, or other criteria.

In the illustrated embodiment, ML labeler 600 includes an active learning record selector 630 to select records for active learning. Configuring active learning record selector 630 may include, for example, specifying an active learning strategy (e.g., lowest accuracy or some other selection technique) and a batch size of records to pass along for further labeling and eventual use as training data for ML labeler 600.

According to one embodiment, active learning record selector 630 selects all unlabeled records (or some specified number thereof) for a use case (records that have not yet been labeled by the ML labeler) and has those labeled by the ML model 620. The ML model 620 evaluates its results (e.g., provides a confidence in its results). Active learning record selector 630 evaluates the confidences in the results and forwards some subset of the results to the other labelers in the graph and/or an oracle labeler for augmented labeling. These records then come back as training data for the ML labeler (albeit potentially with a different answer as determined, for example, by a confidence-driven workflow).

The configuration for ML labeler 600 may include a general configuration and an ML labeler-type specific configuration. The ML labeler-type specific configuration can include an ML algorithm configuration, a training pipe configuration, and a training configuration. The ML algorithm configuration specifies an ML algorithm or platform to use and other configuration for the ML algorithm or platform (layers to use, etc.). In some cases, a portion of the ML algorithm configuration may be specific to the ML algorithm or platform. The training configuration can include an active learning configuration, hyper-parameter ranges, limits, and triggers. A portion of the training configuration may depend on the ML algorithm or platform declared. The ML labeler configuration can also specify conditioning pipelines for the input, output, training, or exception pipes.

Turning now to confidence-driven workflows, ML labelers, human labelers and other labelers can be combined into a confidence-driven workflow (CDW). A CDW can thus be considered a labeler that encapsulates a collection of other labelers, and more particularly, a collection of labelers of the same arity. The encapsulated labelers can be consulted in sequence and their individual results incorporated into an overall result until a configured threshold confidence target for an overall result is reached. A CDW can increase labeling result confidence by submitting the same labeling request to multiple constituent labelers and/or labeler instances. At a high level, multiple agreeing judgments about the same labeling request can drive up confidence in the answer. On the other hand, a dissenting judgment can decrease confidence. A CDW may include one or more ML labelers that can learn over time to perform some or all of a use case, reducing the reliance on human labeling, and therefore driving down time and monetary cost to label data.

Figure 7:
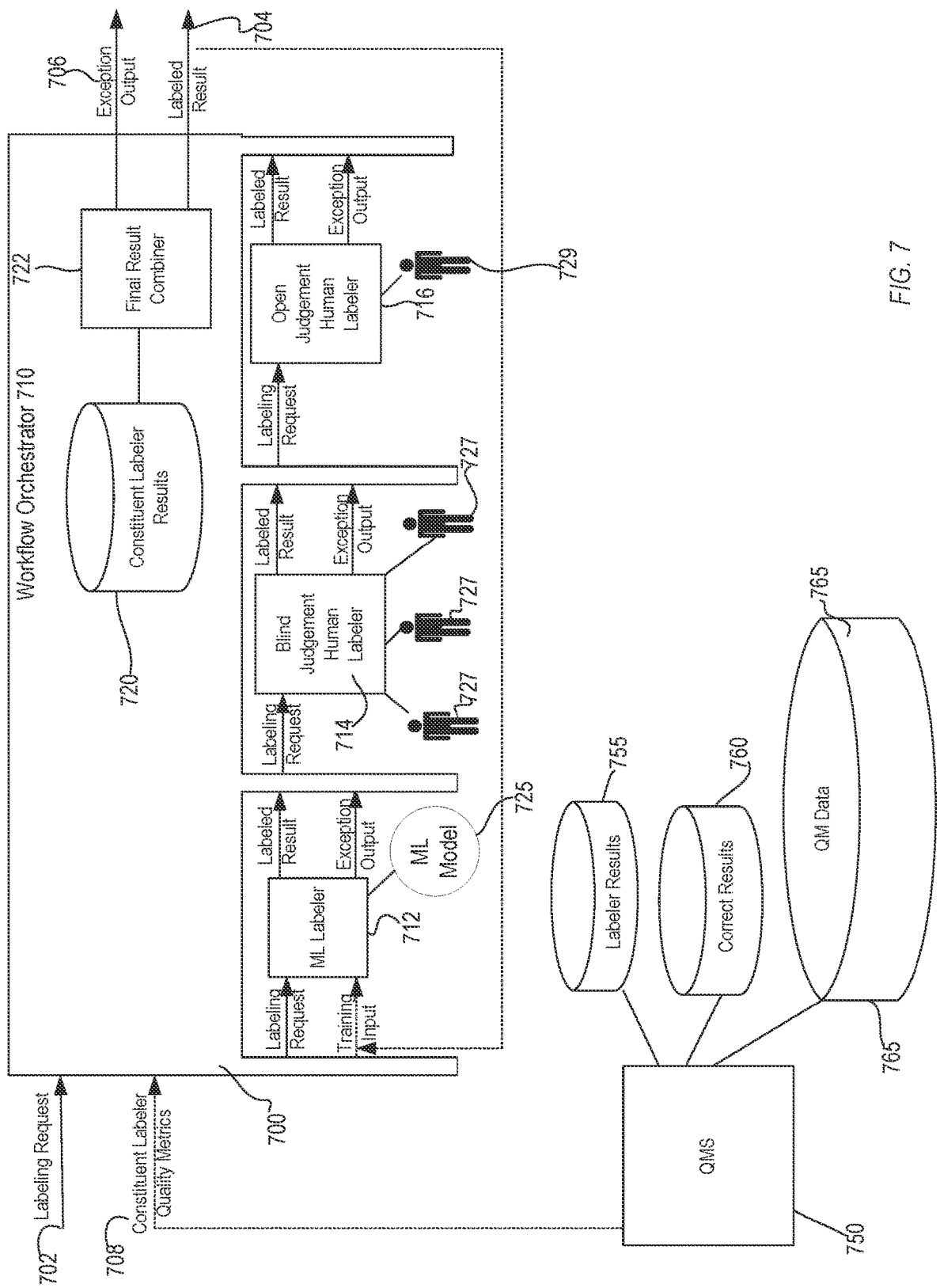
FIG. 7 is a diagrammatic embodiment of one embodiment of a confidence-driven workflow (CDW)

FIG. 7 is a diagrammatic representation of one embodiment of a CDW 700, which may be configured according to a CDW configuration. CDW 700 receives input requests on input pipe 702 and outputs labeled results on output pipe 704. Exceptions are output on exception pipe 706. An element of input received on input pipe 702 may be considered a labeling request (a question) and a labeled output may be considered an answer to that question. A labeling request may be received as a workflow task with accompanying task information, such as a task type description and constraints. Examples of constraints include, but are not limited to, cost constraints in one or more dimensions (e.g., time limit, monetary limit), target threshold confidence or other constraints. CDW 700 receives quality metrics for constituent labelers from a quality monitoring subsystem (QMS) 750 on quality metrics pipe 708. Such quality metrics may include, for example, various scores, confidence estimates, confidence requirements that can be used by workflow orchestrator 710 to dynamically determine a processing path through the labelers of CDW 700.

In the example embodiment illustrated, CDW 700 encapsulates ML labeler 712, blind judgement human labeler 714, and open judgement human labeler 716, though it should be appreciated that a CDW can encapsulate any number of labelers of various types. A labeler may be a gateway to a set (pool) of labeler instances (e.g., deployed ML models, human specialists) that all can service the same types of labeling request. For example, ML labeler 712 acts as an interface to a deployed ML model 725 labeler instance, human labeler 714 acts as an interface to one pool of human specialists 727 and human labeler 716 acts as an interface to a different pool of human specialists 729. Multiple instances can sit behind a single labeler where the labeler provides an interface to the labeler instances. A labeler can thus have a set of labeler instances behind it and can be responsible for routing to specific labeler instances within its pool (potentially through a dispatcher service as discussed above).

Each labeler instance may have an associated description. A labeler instance description may be pulled from multiple sources such as configuration data 117, ML model data 119, QMS 750. A labeler instance description may include the task type description and a labeler instance score. The task type description describes the type of tasks that can be performed by the respective labeler instance. Each labeler instance may have a labeler instance score determined, for example, by QMS 750, and that corresponds to the probability that the labeler instance will produce an accurate label for a given task.

QMS 750 can continually score a labeler instance on how accurately the labeler instance has performed tasks of the same task type in the past. For example, for a labeler instance that answered multiple instances of the question "does this image include a tumor?", QMS 750 can score the labeler instance based on how accurately the labeler instance answered the question over a number of images. According to one embodiment, the labeler instance score is not specific to an answer but is aggregated across all the answers to the question that the labeler produced on prior task instances. In some embodiments, the score for the labeler instance can be refined conditionally into answer-specific scores for each label produced by the labeler. For example, for the question "does this image include a tumor", the QMS 750 can score how often the labeler instance was correct when it labeled images as "tumor" and score how often the labeler instance was correct when it labeled images as "no tumor." The answer-specific scores can be used in determining confidence estimates for an actual result output by the labeler instance Human labeler instance scores and ML labeler instance scores can be tied to specific labeling task types in the scoring system. In some cases, a labeler instance only produces labels for one type of task (e.g., on one type of input data for one type of question) and the labeler instance's score may be tied to that task type. Some labeler instances, for example human specialists, may be able to produce labels across a variety of task types. The capability to produce labels for a task type may be referred to as a skill and some labeler instances may support multiple skills. For a labeler instance that can produce labels for multiple task types, QMS 750 may determine scores on the different task types as skill scores to differentiate the labeler instance's performance across different labeling task types. Thus, a labeler instance, such as a human specialist, may have labeler instance scores for different labeling task types. Alternatively, an aggregate score across the task types supported by the labeler instance may be used.

A labeler instance description may also include costs in one or more dimensions. For example, a labeler instance may have an associated response time (temporal cost) that is an estimate of how long it will take that labeler instance to perform a task. As another example, a labeler instance may have an associated price (monetary cost) that is an estimate of the price for that labeler instance to perform a task. For a labeler instance with multiple skills, the description of the labeler instance may include costs for each skill or a cost that applies across skills.

Each labeler has a labeler description. The labeler description for a labeler may be pulled from various sources such as from configuration data 117, labeler definitions 118, QMS 750 or other sources. According to one embodiment, a labeler description includes a task type description, associated costs (potentially in multiple dimensions) and a labeler score. The labeler description may also include other information, such as a pool size, and descriptors.

A task type description describes the type of labeling request a labeler can service. That is, the task type description describes the type of task that will be performed by the respective labeler instances of that labeler on input data. That task type description may be used for initially configuring labelers available to workflow orchestrator 710. For example, for a particular labeling task, the workflow orchestrator 710 may select from labelers suited for that type of task.

A labeler may also have a labeler score. A labeler's score corresponds to the probability that a labeler will produce an accurate label for a given task. In some embodiments, the labeler's score may be a statistical description (e.g., statistical aggregate) of the labeler instance scores for the labeler instances in that labeler's labeler instance pool. For example, a labeler's score may be a confidence range (score range) for the labeler, such as min, max, mean and variance of the labeler instance scores for the labeler instances in that labeler's pool. A labeler may have different labeler scores for different task types.

A labeler may have associated costs in one or more dimensions. In some embodiments, the labeler's cost in a dimension may be a statistical description (e.g., a statistical aggregate) of the costs in that dimension of the labeler instances in the labeler's pool. For example, the cost for a labeler in a dimension may be a mean and variance, a 95% confidence interval range, or other statistical representation of the costs in that dimension of the labeler instances in that labeler's pool.

For example, each labeler instance behind a labeler may have a temporal cost (response time for that labeler instance to return a label result) and the temporal cost included in a labeler's description may be statistical description of the temporal costs associated with the labeler instances of that labeler, such as a mean and variance, a 95% confidence interval range, or other statistical representation of the temporal costs of the labeler instances in that labeler's pool. As another example, each labeler instance in a labeler's pool may have an associated monetary cost and the monetary cost included in a labeler's description may be statistical description of the monetary costs associated with the labeler instances in that labeler's pool, such as a mean and variance, a 95% confidence interval range, or other statistical representation of the monetary costs of the labeler instances in that labeler's pool.

The pool size is the size of the pool of independent labeler instances behind the labeler, for repeat potential requests to the same labeler with independent results.

Descriptors include information such as whether the labeler is an ML labeler, human labeler. Descriptors may also include a variety of other information, such as metadata about instance pool, A/B condition for testing, etc.

Workflow orchestrator 710 can be configured to determine or control how much visibility each labeler is permitted into accumulated judgements from previous consultations. Labelers may also be specified as "open" or "blind" judgement (e.g., in the workflow configuration). Thus, in some embodiments, a labeler's description may include an indication of whether the labeler is a "blind judgement" or an "open judgement labeler".

A "blind judgement" labeler does not see the labels assigned for a labeling request by other labelers in the workflow. In the illustrated embodiment, for example, workflow orchestrator 710 does not provide the label determined by ML labeler 712 for a labeling request when providing the same labeling request to human labeler 714 because human labeler 714 is a "blind judgement" labeler. An "open judgement" labeler does see the labels assigned by other labelers in the workflow. For example, in the illustrated embodiment, workflow orchestrator 710 passes the labels determined by ML labeler 712 and blind judgement human labeler 714 for the labeling request to human labeler 716 so that the human specialist can see the previously determined labels. In general, allowing a labeler to see the result of previous consultation may enable it to perform its own labeling faster, and therefore at lower cost. However, it also may bias the resulting judgment, which reduces its impact on the overall confidence.

The constituent labelers of a CDW (e.g., labelers 712, 714, 716) are not directly linked. Instead, labeling platform 104 includes a workflow orchestrator 710 to dynamically determine an execution path for processing a labeling request (question) to produce a final labeled result based on confidence and cost constraint configuration.

More particularly, according to one embodiment, workflow orchestrator 710 uses the task information for the workflow task, the labeler descriptions, possibly dynamic labeler characteristics such as cost, availability, and timeliness, and quality metrics from QMS 750 to dynamically determine a path through the constituent labelers 712, 714, 716 to produce a labeled output for the task which satisfies a configured target confidence threshold (a minimum confidence threshold). The path may also be selected to minimize costs in one or more dimensions.

As mentioned above, for a particular labeling task (input labeling request), the workflow orchestrator 710 may select from labelers suited for that type of task. Workflow orchestrator 710 uses the labeler scores and costs associated with the labelers to determine one or more viable paths through the labelers. When a labeler returns a result, a confidence estimate for the result is determined using a score (or other confidence metrics) for the labeler instances in the path that have processed the labeling request. According to one embodiment, once a viable path is determined, workflow orchestrator 710 may route the labeling request through that path until a result reaches a threshold confidence target or the path is exhausted. In other embodiments, the path may be re-evaluated and changed at any time based on the actual results produced by each consultation.

Workflow orchestrator 710 routes the labeling request to the constituent labelers by sending labeler tasks to the selected labelers, with the labeler tasks including respective task information to be used by that labeler in processing the labeling request. A labeler can route a labeling request to a labeler instance as a labeling task, with the labeling task including respective task information to be used by the labeler instance to process the labeling request.

According to one embodiment, the order of consultation of constituent labelers may proceed from least expensive labeler to most expensive labeler, for example, in an attempt to reach the confidence threshold target with the least cost. For example, if ML labeler 712 is the least expensive labeler, blind judgement human labeler 714 is more expensive because labeling requests to blind judgement human labeler 714 are routed to human specialists who have a higher monetary cost based on compensation for work performed, and human labeler 716 is the most expensive of the constituent labelers because labeling requests to human labeler 716 are routed to human specialists with higher expertise and compensation levels than the human specialists associated with blind judgement human labeler 714, then workflow orchestrator 710 may favor consulting ML labeler 712 first, then human labeler 714, then human labeler 716.

Constituent labelers (e.g., labelers 712, 714, 716) are consulted until the configured target confidence threshold (e.g., as specified in a use case) is reached or the path is exhausted (for example, there is no viable path to achieve the target confidence threshold). A given constituent labeler may be consulted more than once in the execution path. If the same labeling request is submitted to the same human labeler (e.g., human labeler 714, human labeler 716) multiple times, the human labeler may be configured to route the request to a different labeler instance (human specialist), each with their own associated quality metrics, each time. The workflow rules implemented by workflow orchestrator 710 can be configured to guarantee termination, so overall cost is bounded. As the quality of an ML labeler in a CDW goes up over time, it is possible that most execution paths for a task type will terminate after a single consultation of the ML labeler.

For a labeling request, final result combiner 722 combines results from the multiple labelers in a CDW. In a simple case, there is one question and all constituent labelers provide outputs corresponding to the same question, (e.g., does the image contain a tumor), and the judgments from the constituent labelers (e.g., tumor, no tumor, tumor) are stored in 720 as they build up. The final result combiner 722 is configured to recognize the answer that reached the target confidence threshold and produce a final result with that answer. For example, if the final result combiner determines that the answer "tumor" reached the target confidence threshold for a labeling request, the final results combiner 722 can output the labeled result with the label "tumor."

FIGS. 8A, 8B, 8C, 8D illustrate example execution paths using constituent labelers 712, 714, 716 of CDW 700. The "consultations axis" represents consultations executed using the constituent labelers and the "confidence" axis represents the confidence of the overall labeling result that incorporates the individual labeling results obtained so far for the labeling request. CDW can be configured dynamically determine an execution path to optimize the confidence of the overall labeling result that incorporates the individual labeling results obtained so far for the labeling request. Various strategies may be used by the CDW to incorporate the individual results into an overall result. One strategy is simply to evaluate the most recent individual result in isolation. Other strategies also be used. As discussed further below, the execution path may be dynamically determined based on the scores and costs associated with labelers 712, 714, 716.

Figure 8A:
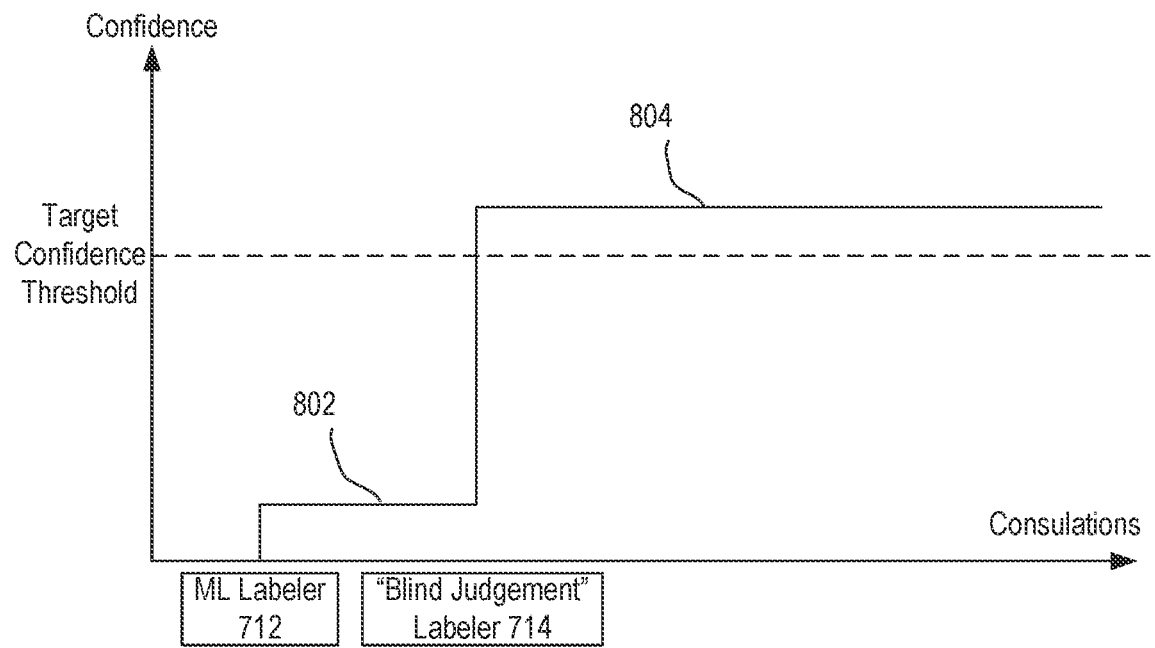
FIG. 8A is a diagrammatic representation of a first path through one embodiment of a CDW and example confidence estimates.

Initially, ML labeler 712 may have a low confidence due to lack of training of ML model 725 (labeler instance). During this period, a typical labeler consultation sequence might be to route the labeling request as illustrated in FIG. 8A. In this example, the labeling request is routed to ML labeler 712, which returns an answer for which a confidence estimate 802 is determined. The labeling request is then routed to blind judgement human labeler 714, which produces an answer for which a confidence estimate 804 is determined. As discussed below, confidence estimate 804 may be a complex granular confidence estimate based on a simple granular confidence estimate determined for the answer output by ML labeler 712 and a simple granular confidence estimate determined for the answer output by human labeler 714. For example, if the answer output by human labeler 714 agrees with the answer output by ML labeler 712, this may result in that answer being considered a high-confidence answer that exceeds the target confidence threshold. Thus, the answer (label) returned by human labeler 714 can be used for the final labeled results of CDW 700.

Figure 8B:
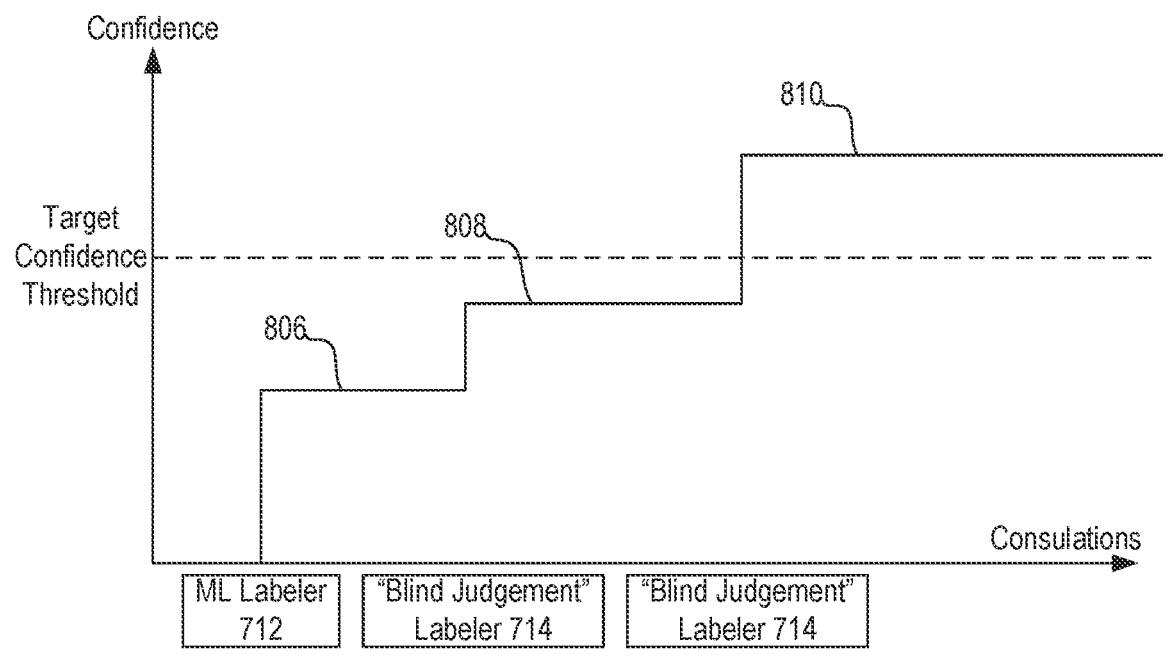
FIG. 8B is a diagrammatic representation of a second path through one embodiment of a CDW and example confidence estimates.

In the example of FIG. 8B, the labeling request is routed to ML labeler 712, which returns an answer for which a confidence estimate 806 is determined. The labeling request is then routed to blind judgement human labeler 714, which produces an answer for which a confidence estimate 808 is determined. As the target confidence threshold has not been reached, the labeling request can be routed to blind judgement human labeler 714 twice because there are labeler instances (human specialists 727) remaining in the pool of human labeler 714 that have not yet been consulted for the labeling request. The confidence estimate 810 for the answer produced by the second consultation with human labeler 714 may incorporate confidence estimates 806, 808, however, exceeds the target confidence threshold. Thus, that answer can be used for the final labeled results of CDW 700.

Figure 8C:
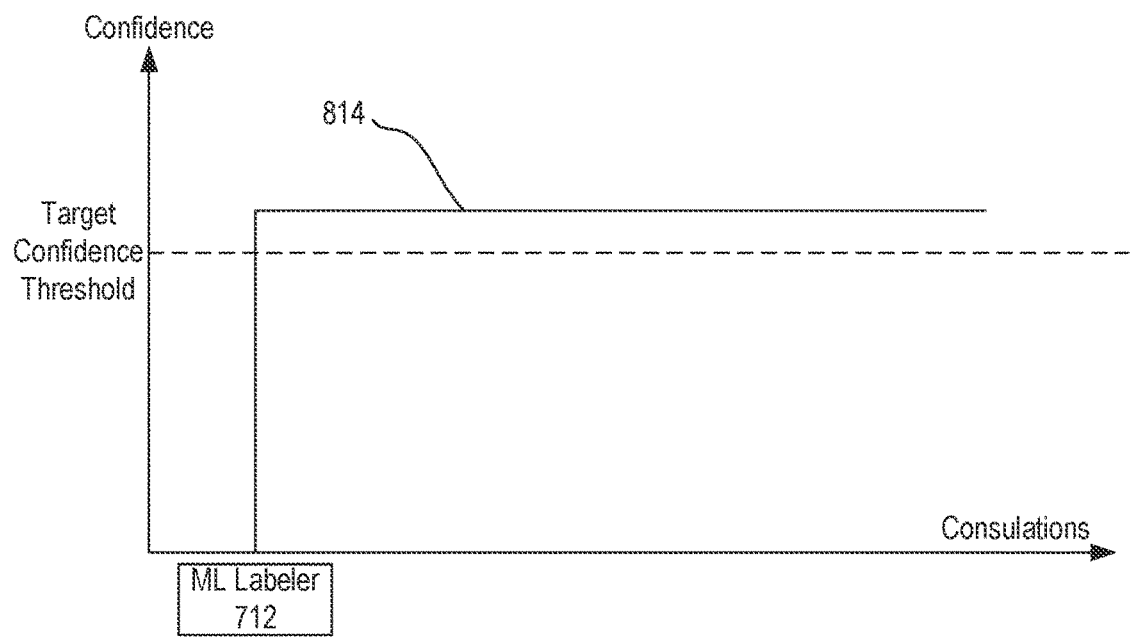
FIG. 8C is a diagrammatic representation of a third path through one embodiment of a CDW and example confidence estimates.

Results that meet the configured target confidence threshold (or other training data) can be used to retrain ML labeler 712. ML labeler 712 may quickly become very accurate for the vast majority of labeling requests that it handles. Once this has been achieved, the ML labeler 712's answers may satisfy the configured target confidence threshold by itself and many labeling requests to CDW 700 may be satisfied by ML labeler 712 alone, reducing the time and cost associated with the use of human specialists. In FIG. 8C, for example, the processing path by constituent labelers involves a single consultation by ML labeler 712, which can produce an answer having a high confidence estimate 814 that exceeds the target confidence threshold for the labeling request. In this example, the answer returned by ML labeler 712 can be used for the final labeled results of CDW 700 and no other labelers in the CDW are consulted.

Figure 8D:
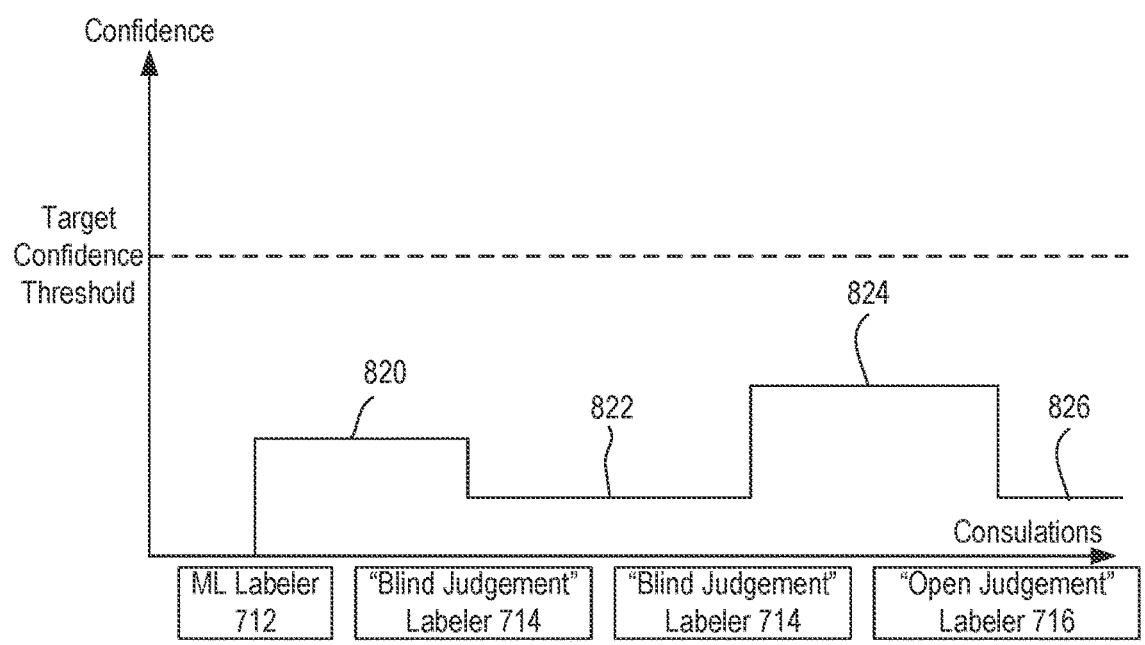
FIG. 8D is a diagrammatic representation of a fourth path through one embodiment of a CDW and example confidence estimates.

FIG. 8D illustrates another example execution path. In this example, the labeling request is routed to ML labeler 712, which returns an answer for which a confidence estimate 820 is determined. The labeling request is then routed to blind judgement human labeler 714, which produces an answer for which a confidence estimate 822 is determined. As the target confidence threshold has not been reached, the labeling request is routed to blind judgement human labeler 714 twice. The first consultation with human labeler 714 results in an answer for having confidence estimate 822 and the second consultation with human labeler 714 results in an answer with a confidence estimate 824. The labeling request is routed to human labeler 716, which produces an answer having confidence estimate 826. In this example, the CDW cannot converge on an acceptably confident answer within configured execution limits. As such, the labeling attempt is considered a failure, and an exception is generated for the labeling result.

Returning to FIG. 7, QMS 750 provides quality metrics that may be used to dynamically determine the execution path and determine if a label result received from a constituent labeler (or agreed to by multiple labelers) exceeds the configured target confidence threshold.

The probability that a given label result output by a labeler (e.g., labeler 712, 714, 716) for a labeling request is accurate is referred to herein as a "confidence estimate." That is, a "confidence estimate" refers to an estimate of confidence in the result (probability of accuracy). In other words, the "confidence estimate" is an amount of confidence the labeling system has in a result. This "confidence estimate" (a value corresponding to the probability of accuracy) may have a (statistical) confidence interval around it.

According to one embodiment, QMS 750 performs a number of tasks to facilitate the use of confidence estimates. QMS 750 provides confidence estimates for a given label result to other parts of the architecture. Confidence estimates from QMS 750 for a labeled result can be used to track the confidence of the result throughout the arc of a confidence driven workflow. The confidence estimate for a label result can be used, for example, to determine if the labeled result has reached the target threshold confidence.

QMS 750 can continuously monitor and score labeler instances over time to generate, maintain, and improve confidence estimates. Monitoring and scoring can be used by QMS 750 to generate the confidence estimates.

QMS 750 can predict what the confidence estimate will be for a given labeling task (before the labeling is done) under an array of circumstances where that task could be performed by different labelers or sets of labelers. The predicted confidence estimate describes the predicted benefit from each set of potential labelers that workflow orchestrator 710 could select for a labeling request. The workflow orchestrator 710 can balance the predicted benefit against the costs associated with each labeler to dynamically determine an execution path.

QMS 750 can identify the set of constraints on labelers required to achieve a desired confidence threshold for an overall result (which may be composed of results from multiple labelers). For example, the QMS 750 can back solve the confidence estimate equations relevant to a particular labeling task so that, given a target confidence threshold, it identifies an individual labeler confidence constraint for each participating labeler in a candidate sequence of labelers—that is, it identifies the minimum confidence estimate for each labeler required to achieve the overall target confidence threshold. In some embodiments, the confidence estimate equation may have a closed-form solution and a simulation/sampling approach may be used to back-solve for the confidence estimate constraints.

Confidence relates to the probability that a given label result is accurate. As an indication of probability, confidence estimates range between 0 and 1 according to some implementations. According to one embodiment, QMS 750 estimates confidence on a per-judgement basis (at the granularity of a single judgement/label). That is, QMS 750 may determine granular confidence estimates, where a granular confidence estimate corresponds to a single label that cannot be further decomposed into component labels. QMS 750 calculates composite confidence estimates (for results having more than one label) by combining granular confidence estimates of the constituent labels.

Granular confidence estimates can be simple or complex. Simple granular confidence estimates occur when there is only one labeler consulted one time for a given label (one judgement, one label). Complex granular confidence estimates are required when more than one judgement (almost always from multiple, different labelers or labeler instances) impacts a single label (multiple judgements, one label). Examples using complex granular confidence estimates are when one labeler provides a judgement and another labeler reviews that judgement, or when multiple labelers are asked for the same judgement independently, and the final result corresponds to the answer that meets the target confidence threshold.

Simple granular confidence estimates are based on an individual labeler's performance. The simple granular confidence estimate for result produced by a labeler may be based on a score determined for the labeler instance that processed the task or a self-reported confidence provided by the labeler instance. Complex granular confidence estimates combine simple granular confidence estimates. According to one embodiment, complex granular confidence estimates combine simple granular confidence estimates in one of two ways (independent or conditional), each of which are configurable at the level of a mathematical probability formula or ML estimation model for combining into a single probability value.

Independent (Blind). The individual simple granular confidence estimates contributing to a complex granular confidence estimate are treated as independent if there is no interaction between the labelers. The order in which the labelers are consulted does not impact their judgements, and the results of one labeler are not visible at any point to the other labelers. For example, in a labeling task that requires "multiple blind judgements," the labelers would be treated as independent. Note that while the "blind judgement" labelers are independent of each other, they are dependent on the actual labeling task/input, so a conditional probability formula can be used. The mathematical probability formula for combining two multiple such blind judgements follows the "probability of disease given two independent tests" textbook paradigm. This formula can be extended to n number of labelers. For example, confidence estimate 804 of FIG. 8A for the judgement returned by human labeler 714 may be determined using a simple granular confidence estimate determined for the judgement of ML labeler 712, a single granular confidence estimate for the judgement returned by human labeler 714 (and implicitly whether the judgements agreed).

Conditional (Open). The individual simple granular confidence estimates contributing to a complex granular confidence estimate are treated as conditional if there is interaction between the labelers (e.g., for open tasks in which later labelers can see the prior labeler's work). The order in which the labelers are consulted does matter, and the results from one labeler may be visible to other labelers. For example, a labeling task that requires one labeler to assess another labeler's output would be treated as conditional. In this case, one possible mathematical probability formula for combining two judgements, one content and one review is straightforward conditional probability, the probability that worker X (e.g., labeler instance) is correct given that worker Y (e.g., labeler instance) accepts the answer is $P(Xc|Ya)=(P(Ya|Xc)P(Xc))/P(Ya)$. This formula can also be extended to n number of labelers in the reviewer role.

Using the example formulas above, calculating complex granular confidence estimates requires calculating probability values for prior and conditional probabilities above and beyond a simple granular confidence estimate, $P(Xc)$, the probability that a single labeler is correct for a single label. These additional probability values are calculated based on counts/frequencies of actions observed on the platform similar to how counts can be used to generate simple granular confidence estimates, as described below.

It will be appreciated that the foregoing examples of complex granular confidence estimates use probability models and are provided by way of example and not limitation and various methods of determining the complex granular confidence estimate may be used. For example, approaches may be employed that take into account the actual value of the answer (e.g., precision versus recall considerations, which into account differences in false positives versus false negatives and different likelihoods of providing one wrong answer versus a different wrong answer when the true answer is x versus if it is y.) In some embodiments, logistic regression methods or other estimators may be applied to determine complex granular confidence estimates rather than closed form probability equations. In some embodiments, an ML estimation model may be used for combining into a single probability value. By way of example, but not limitation, logistic regression models can be trained for combining confidence estimates into a single probability value.

Some embodiments may implement multiple methods for determining complex granular confidence estimates. It can be empirically determined which method gives the best results for a particular workflow and that method may be used for the workflow.

When a result contains more than one label, QMS 750 can combine the granular confidence estimates for the component labels to create a composite confidence estimate for the overall result. For example, it may be easier to label a video by splitting the video into frames and labeling the individual frames. The confidence estimate for the video may be a composite confidence estimate based on the confidence estimates for the individual frames. Consider, as another example, a use case for localizing and classifying retail products in an image where there are hundreds of possible product types. In such an embodiment, the confidence estimate for the overall labeled result may be a composite of the confidence estimates for each product label.

The combination of confidence estimates to create a composite confidence estimate is configurable at the level of a mathematical formula and which formula is selected may be dependent on the goals of the task and how the confidence values will be interpreted. Some example configurations are listed below:
1) Product of the confidence values of all component parts. Emphasizes importance of getting the entire set of labels being correct without missing any. This is the classic probability of co-occurrence of multiple independent events. Applies best to truly independent component judgements where all parts must be correct in order for the value proposition to be met.
2) The minimum confidence value over all the component parts represents the confidence of the overall result. Emphasizes a minimum threshold confidence for multi-part results. Applies best to labeling compositions resulting from decomposition of output label space or multi-judgement tasks (same as decomposition of the output space, but a single labeler provides all component judgements such as in a list of questions).

3) Alternately, a different minimum confidence value may be configured/specified separately for each sub-component part, and a distance metric can be specified based on how far each part is from its minimum confidence. Emphasizes that no single number can represent the confidence value for the entire task.

QMS 750 can determine confidence estimates from actual data observations on the platform (e.g., frequency counts of the event of interest compared to total count of relevant events). Labeling platform 104 may also support heuristic and manually generated confidence estimation approaches, as needed.

In general, a strong data-driven predictor of future performance is past performance. Platform can support any configurable algorithm for calculating confidence estimates, based on, for example, event counts. The event counts of interest are counts of accurate and inaccurate labels, which in some cases (e.g., categorical or binary classifications) can also be represented as a confusion matrix.

For example, if the platform knows how often a labeler instance has gotten a particular kind of question right before, it can estimate that the labeler instance will get that question right in the future with the same frequency (or proportion). In some embodiments, the platform can estimate the probability that a labeler instance will produce an accurate label as a function of that labeler instance's history of accuracy. A more complex and robust model, such as a beta reputation approach (see, Audun Jøsang, Roslan Ismail. The Beta Reputation System. 15th Bled Electronic Commerce Conference e-Reality: Constructing the e-Economy Bled, Slovenia, Jun. 17-19, 2002, which is hereby fully incorporated by reference herein) could be used.

QMS 750 continually measures and records the accuracy of labeler instances' work and generates scores for each labeler instance, which may be stored in QM data 765. According to one embodiment, QMS 750 assesses scores in generally the same way for human labeler instances or ML labeler instances, by creating scoring actions for a set of labels produced by each labeler instance. For example, QMS 750 can determine a score for each human represented by a human labeler and each ML model, including different versions of the same ML model trained on different data, represented by an ML labeler. For example, in the embodiment illustrated in FIG. 7, QMS 750 can determine a score for ML model 725, each human specialist 727, and human specialist 729, and store the scores in QM data 765. The scores for labeler instances represented by a labeler may be aggregated into a score for the labeler. The score for a labeler may be, for example, a confidence range (score range).

QMS 750 may build up an initial score or scores for a labeler instance based on a set of scorable (i.e., can be assessed by the platform as CORRECT or INCORRECT) tasks performed by that labeler instance, where the set of tasks may include repetitions of the same task type on different inputs. QMS 750 aggregates scoring actions generated for those tasks and determines an initial score or scores for the labeler instance. For example, for a labeler instance that answered multiple instances of the question "does this image include a tumor?", QMS 750 can score the labeler instance based on how accurately the labeler instance answered the question over a number of images. According to one embodiment, the labeler instance's score is not specific to an answer but is an overall score aggregated across all the answers to the question that the labeler produced on prior task instances (e.g., overall, how accurate the labeler instance was in answering the question). In some embodiments, the labeler instance score for the labeler instance can be refined conditionally into answer-specific scores for each label produced by the labeler. For example, for a question, the QMS 750 can score how accurately a labeler instance labeled images "tumor" and score how accurately the labeler instance labeled images "no tumor."

QMS 750 can use scores for individual labeler instances represented by a human or ML labeler to create an aggregate description of the labeler instance scores represented by that labeler. QMS 750 may update scores as data is labelled by the labeler instances.

Figure 9:
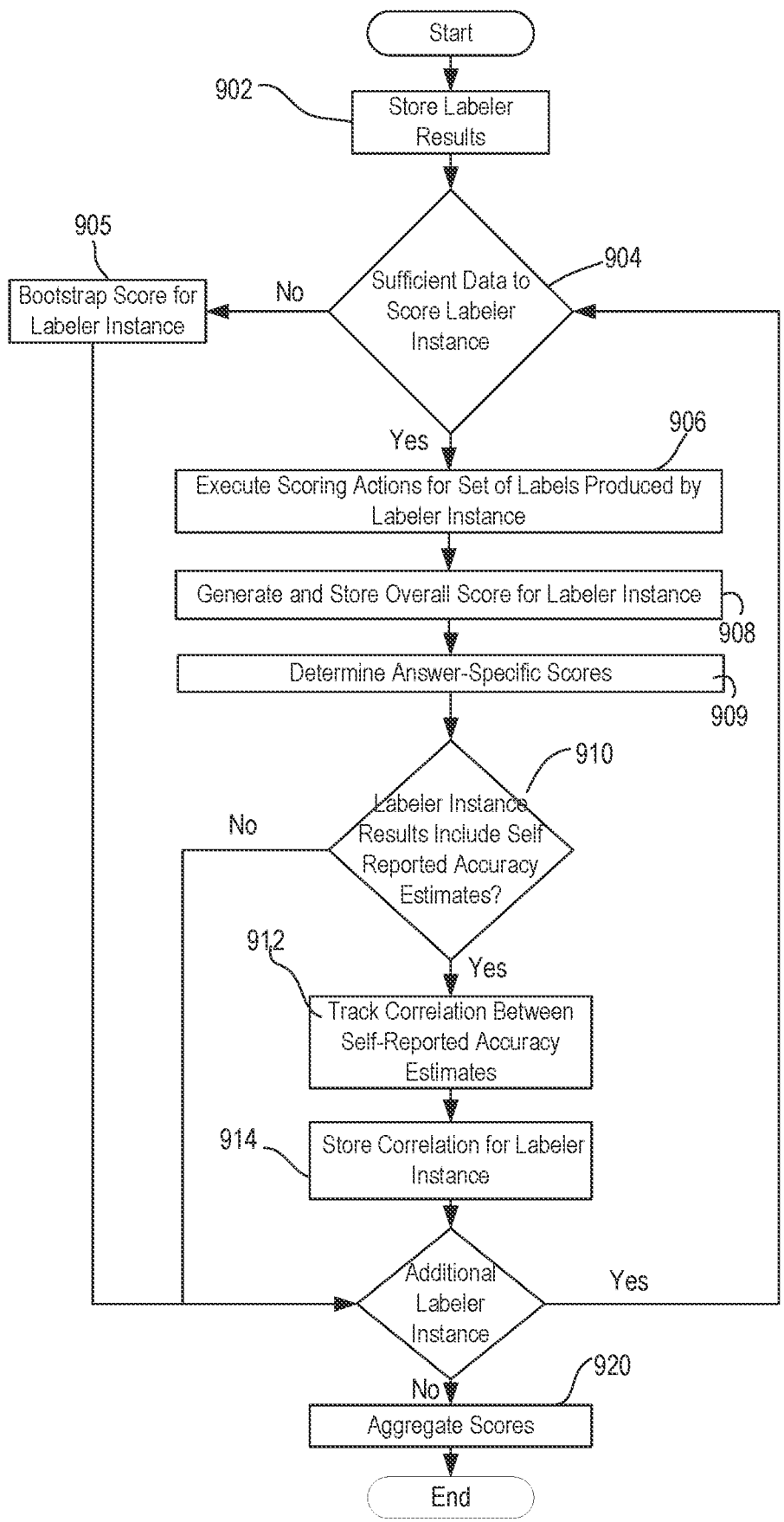
FIG. 9 is a flow chart illustrating one embodiment of determining quality metric data.

FIG. 9 is a flow chart illustrating one embodiment of determining quality metric data, including scoring labeler instances. The steps of FIG. 9 may be embodied as computer-executable instructions on a non-transitory computer-readable medium. One or more steps of FIG. 9 may be implemented by a labeling platform. By way of example, but not limitation, one or more steps of FIG. 9 may be performed by QMS 750.

At step 902, results produced by labeler instances are stored (for example as labeler results 755). It can be noted labeler results 755 can be tracked at the level of the labeler instance that determined the result. The labeler results may include, for example, the task type for which the result was generated, the identity of the labeler instance that produced the result, the labeled result generated for the task, any self-reported estimate of accuracy by the labeler instance, and other data.

QMS 750 can determine an initial labeler instance score for each labeler instance based on a set of scorable tasks performed by the labeler instance. In some cases, as determined at step 904, there may not be enough information (data) to calculate a score for a given labeler instance for a given task type (e.g., because there are no gold answers to compare to, it is impractical to gather labels for scoring alone, etc.) In such cases, QMS 750 may use a bootstrapping method to calculate a score for a labeler instance (step 905). This initial score is an estimate, and—as a bootstrap—the initial estimate can be generated in a variety of heuristic ways that the labeling platform 104 can support as input. Because heuristic approaches for creating a score generally do not have a solid foundation in quantifiable measurements, they can be replaced with data-driven estimates as soon as enough data is available for statistical significance.

To provide some non-limiting examples, heuristic initial scores may reflect estimates based on the following:
1) Labeler instance starts with a default score (for example, 0.5 indicating a 50/50 chance of getting an answer right or wrong).
2) A score can be hard-coded for a particular labeler instance based on a platform operator's prior experience with that labeler instance.
3) In some cases, a human labeler instance's score on one task may be used to bootstrap estimates of performance on another task (e.g., bounding boxes for cats may be similar enough to bounding boxes for cars, or fashion categorization may be determined to correlate with skill on beauty product categorization).
4) Characteristics of human labeler instances such as IQ tests or other training quizzes may be used to create a heuristic baseline that is scaled to other metrics deemed relevant by the task designer.

According to one embodiment, the score for a labeler instance self-corrects from the bootstrapped score through actual scoring over time as the labeler instance performs more tasks that are scored. As data builds, the bootstrap heuristic models are replaced with data driven models. In addition, the scoring approach itself can also be configured to discount older scored performance (for example, using beta reputation decay).

If there is sufficient data to calculate a score for a labeler instance, processing can proceed to step 906. QMS 750, at step 906, creates scoring actions for the set of labels produced by the labeler instance. A scoring action is an assessment of whether an individual label determined by the labeler instance for a data item is deemed CORRECT or INCORRECT. According to some embodiments, this is a binary determination, though other embodiments may incorporate varying (non-binary) degrees of correctness. There are various ways to make this binary CORRECT/INCORRECT determination, including, but not limited to:

1) Direct compare—an exact match to a known result. This approach is applicable to: Binary yes/no, simple String match (multiple choice or research tasks with one correct answer like a known, fixed URL), deep JSON compare, fixed-form complex result—this could be a deep data-structure compare for example.
2) Threshold—an acceptable degree of similarity to a known result. Applicable to: polygon areas (IOU), transcriptions as "close enough" with few missed words (measured by edit distance for example), ordinal grades/valuations as +/−1, etc.
3) Subjective/Freeform. Applicable to: subjective tagging/labeling, research tasks with open-ended acceptable answers.

Direct and threshold comparisons can be programmatically calculated using independently derived results and comparison results. Subjective and freeform comparisons may require an assessment of the result itself against some criteria and the CORRECT answer is therefore dependent on the result itself (that is, a result can be judged to be CORRECT or INCORRECT but a closed-form CORRECT answer may not be available). In the subjective/freeform case, a given label may be determined to be ACCEPTED or REJECTED via a review/adjudication process.

In accordance with one embodiment of a scoring approach, determinations for direct and threshold comparisons are made against an "eventually accepted" result that has been determined to be CORRECT. This could be a gold record, the result of a workflow that gets a result to a high enough confidence, the result of a task that has been accepted by the end-user (the entity using the labeled results), and so forth. QMS 750 may support scoring actions through various mechanisms. According to one embodiment, QMS 750 compares the labeler results 755 (e.g., labels output by labeler 712, 714, 716 for input elements/labeling requests) to "correct" labels 760 for the input elements/labeling requests, where the correct labels may be, for example: gold data (sometimes referred to as "ground truth" data), high confidence results (e.g., the final label results output by CDW 700 that exceed the confidence threshold) or other labels deemed to be correct. Scoring actions may also be recorded based on, for example, workflow adjudications/overrides (review plus content changes), escalate/exception results, admin review, or end-user feedback.

In any case, the labeled results produced by each labeler (e.g., ML labeler 712, blind judgement human labeler 714 and open judgement human labeler 716) for a labeling request may be marked as CORRECT or INCORRECT, and the marked labeling results can be used to determine the accuracy of the labeler instance that produced those results.

More than one type of scoring action can be used for a single label (e.g., gold and end-user feedback). Depending on the task (e.g., how ambiguous cases might be, what type of comparisons are needed, the volume of scoring actions available from various types, etc.), a score for a labeler instance can be configured as a weighted sum of scores calculated from different scoring action sources (e.g., 50/50 gold and customer feedback), or configured to combine scoring actions of various types into a single scoring formula (e.g., the alpha and beta parameters in a beta reputation model would include counts from both types of scoring actions).

Some labeler instances only produce labels for one type of task (task type, e.g., on one type of input data for one type of question). Other labeler instances, in particular, human specialists, can produce labels across a variety of task types. Both human labeler instance scores and ML labeler instance scores can be tied to specific labeling task types in the scoring system (i.e., labeler instances can have different scores relevant to making different confidence estimates). In the case of instances that can produce labels for multiple task types, QMS 750 may determine scores on different task types as skill scores to differentiate a labeler instance's performance across different labeling task types. Thus, for example, a human labeler instance may have a plurality of scores, where each score corresponds to a different labeling task type or, alternately, an aggregate of related task types.

At step 908, QMS 750 can thus determine a labeler instance score (including, in some cases, multiple labeler instance scores) for each labeler instance reflecting overall reputation or reputation on some subset of tasks or types of tasks, which corresponds to the probability that a labeler instance will produce an accurate label for a given task, and which is calculated via a configurable mathematical algorithm using, for example, accuracy count data (including full confusion matrix counts where applicable in classification tasks) of previously produced labels. These individual labeler instance scores can be aggregated at the labeler level (e.g., ML labeler 712, blind judgement human labeler 714 and open judgement human labeler 716) to generate a labeler score, which can be statistical description derived from the underlying labeler instance scores.

At step 909, QMS can determine answer-specific scores for the labeler instance. An answer-specific score represents how often the labeler instance was correct in labeling data items with a particular label for a set of tasks (task instances of a task type). For example, for the question "does this image include a tumor", the QMS 750 can score how often the labeler instance was correct when it labeled images as "tumor" and score how often the labeler instance was accurate when it labeled images as "no tumor." The answer-specific scores can be used in determining confidence estimates for an actual result output by the labeler instance.

Many ML models report "confidence" (i.e., self-reported confidence estimates) for the labels they produce. Humans can be asked self-report accuracy estimates as well, through the user interface, for each label provided. Because humans are typically bad at directly estimating probabilities accurately, the user experience for reporting confidence values may be subject to task design considerations and conversion to probability estimates. As a simple case, when a human specialist is tasked to provide a label, the human specialist can be asked for the label and a certainty value (1 to 5) for the label. In this example, a self-reported confidence estimate for the human can be calculated as a matrix of conditional probabilities using accuracy counts under each certainty condition (probability of correctness given that reported certainty is X) to determine a certainty-modified probability.

In any case, a labeler instance may self-report an estimate of the accuracy of its answer—that is, a labeler instance may provide a self-reported confidence estimate. This self-reported estimate is contextualized for each specific answer (label) on each specific input (data item labeled) and can therefore represent a more precise estimate of the probability of accuracy for a given result compared to other types of estimates. The self-reported estimates of accuracy by the labeler can be included with the label result output by a labeler and stored in labeler results 755. With the prior label results marked as correct or incorrect, QMS 750 can determine and store a correlation between the self-reported probability of accuracy and the actual accuracy for the labeler instance (step 914).

Steps 902-914 can be repeated for each labeler instance. At step 920, the scores for labeler instances represented by a common labeler can be aggregated for that labeler. For example, the scores for human specialists 727 can be aggregated to create a labeler score (for example, a confidence range) for human labeler 714. As another example, the scores for ML models represented by ML labeler 712 can be aggregated to determine a score for ML labeler 712.

QMS 750 may dynamically determine scores for labeler instances (e.g., step 908). Thus, the confidence ranges of labelers can also be dynamically determined. In some embodiments, QMS 750 performs steps 906 and 920 for a labeler—that is determines labeler instance scores for the labelers represented by the labeler and creates a labeler score for the labeler—in response to a request from a labeler. In other embodiments, QMS 750 continually determines labeler instance and labeler scores and provides the scores when requested.

Moreover, after an initial score or scores are determined, QMS 750 can continue to score the labeler instances intermittently based on inference monitoring strategies, and thus the scores for the labeler instances and the labelers can be updated. The number of scored actions in the initial score(s) and the rate of intermittent scoring is configurable. QMS 750 may thus use scoring approaches where data about individual labeler instances' accuracy is collected and updated as data is labeled on the platform.

FIG. 9 is provided by of example and not limitation. Various steps may be repeated, steps may be performed in different orders, steps omitted, and additional or alternative steps performed.

Figure 10:
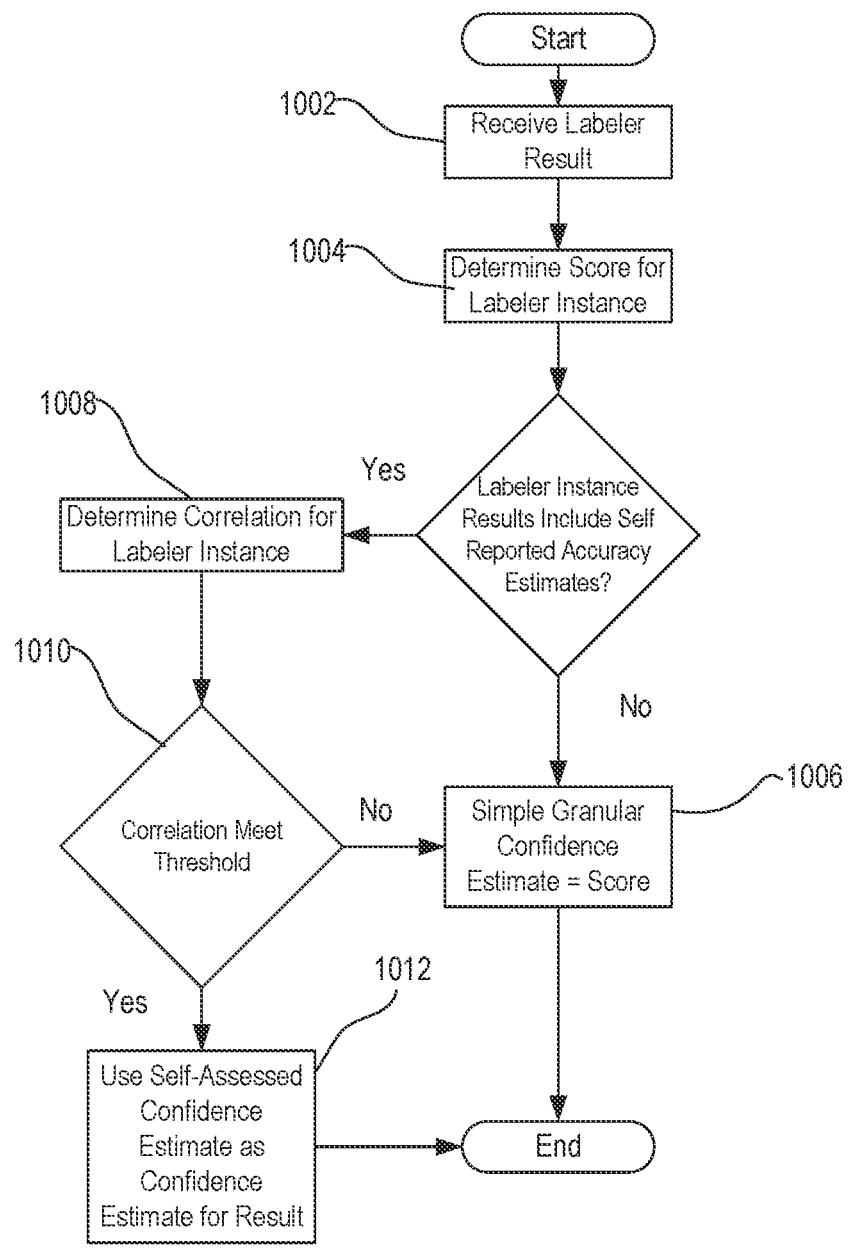
FIG. 10 is a flow chart illustrating one embodiment of determining a confidence estimate for a labeled result.

In operation of CDW 700, the scores determined for labeler instances may be used to determine confidence estimates for the answers output by each labeler. FIG. 10 is a flow chart illustrating one embodiment of determining a granular confidence estimate for a result output by a labeler. The steps of FIG. 10 may be embodied as computer-executable instructions on a non-transitory computer-readable medium. One or more steps of FIG. 10 may be implemented by a labeling platform. By way of example, but not limitation, one or more steps of FIG. 10 may be performed by QMS 750.

At step 1002, a labeler result is received. The labeler results may include, for example, the task type for which the result was generated, the identity of the labeler instance that produced the result, the labeled result output the labeler, any self-reported estimate of accuracy by the labeler instance, and other data. At step 1004, QMS 750 determines the score for the labeler instance that determined the result. For example, QMS 750 may access the labeler instance score generated for the labeler instance at step 905 or step 908 and QMS 750 uses the labeler instance score for the task type as the granular confidence estimate for the labeled result output by the labeler (step 1006). In other embodiments, QMS 750 may determine an answer-specific score for the labeler instance (e.g., as determined at step 909), where the answer-specific score corresponds to the label output by the labeler instance, and uses the answer-specific score as the granular confidence estimate for the labeled result output by the labeler.

In some embodiments, when self-reported estimates are available, they may be used to refine score-based estimates of accuracy. Note that under various cases, the QMS 750 may use the self-reported estimate directly, or use it to discount, increase, or otherwise modify a score-based estimate. According to one embodiment, the QMS 750 uses the labeler's self-reported confidence estimate for a label (e.g., as the simple granular confidence estimate for the label) when:

1) The labeler instance's estimate of its confidence in the label provided corresponds to a probability value; and
2) The correlation between the self-reported probabilities of accuracy by the labeler instance and actual accuracy is high.

As discussed above, QMS 750 can track a correlation between the self-reported probability of accuracy and the actual accuracy for the labeler instance. Thus, at step 1008, QMS 750 may access the correlation between the self-reported probability of accuracy and the actual accuracy for the labeler instance for the task type and determine if the correlation is above a configurable threshold (step 1010). If the correlation meets the threshold, then the self-reported probability estimates can be used as the confidence estimate for the labeler result (step 1012). If the correlation does not meet the threshold, the confidence estimate for the labeler instance reverts to the labeler instance's score (e.g., as determined by initial and intermittent scoring) (step 1006).

FIG. 10 is provided by way of example and not limitation. Various steps may be repeated, steps may be performed in different orders, steps omitted, and additional or alternative steps performed. Moreover, while FIG. 10 describes an embodiment of determining a simple granular confidence estimate, it will be appreciated that QMS 750 may determine complex granular confidence estimates when multiple labelers in a path have processed a labeling request. The complex granular confidence estimates for an answer may be based on the answer-specific scores determined for the labeler instances in the execution path, if available, overall scores determined for the labeler instances for a task, self-assessed confidences of the labeler instances or combination thereof. For example, the simple granular confidence estimate for each labeler instance may be determined as discussed in conjunction with FIG. 10, and the simple granular confidence estimates combined.

Turning now to path selection, labeling platform 104 may be configured to route tasks to labelers based on any number of constraints that match the labelers' descriptions. Specific sequencing of labelers can be specified to achieve predefined workflows. For example, a CDW configuration may specify that the workflow orchestrator first use a specific ML Labeler with a pre-specified set of constraints that are passed to the labeler for execution, followed by a specific human labeler, with a different pre-specified set of constraints. This allows predefined workflows to be activated using the CDW in specific circumstances (Testing, Crowd Curation, Validation). These predefined workflows offer only one path for the workflow orchestrator to route a task through specified labelers.

In addition, or in the alternative, CDW 700 can be configured with a set of labelers to use without predefining how those labelers are sequenced. Workflow orchestrator 710 determines viable execution paths through the constituent labelers. An execution path through the constituent labelers is considered viable for a given task if it can satisfy all of that task's constraints. Finding one or more viable execution paths does not guarantee a task's overall constraints will be satisfied because the actual confidence achieved after executing a planned path may differ from the upfront prediction.

Figure 11A:
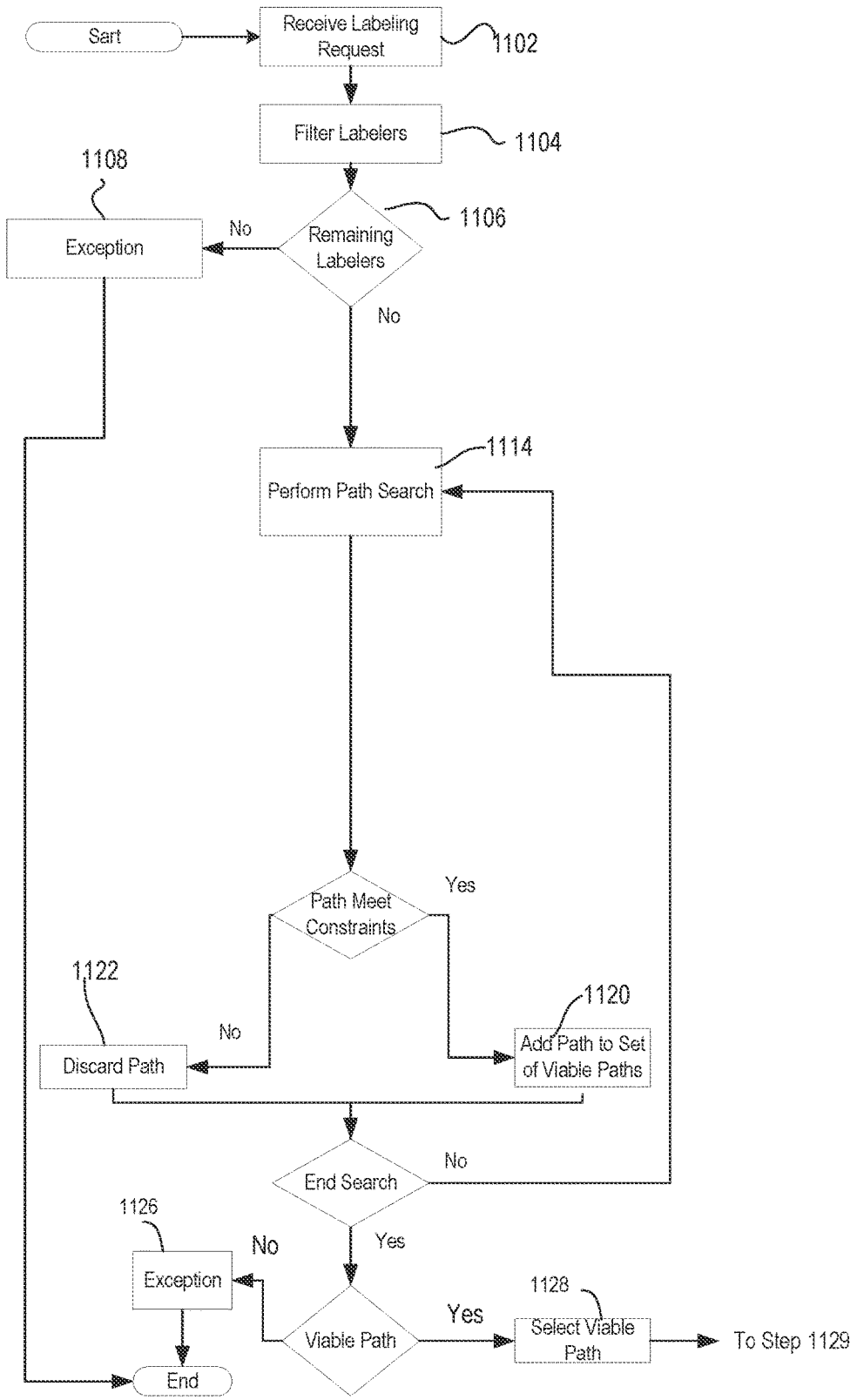
FIG. 11A and FIG. 11B are a flow chart illustrating one embodiment of a method for dynamic path selection.
Figure 11B:
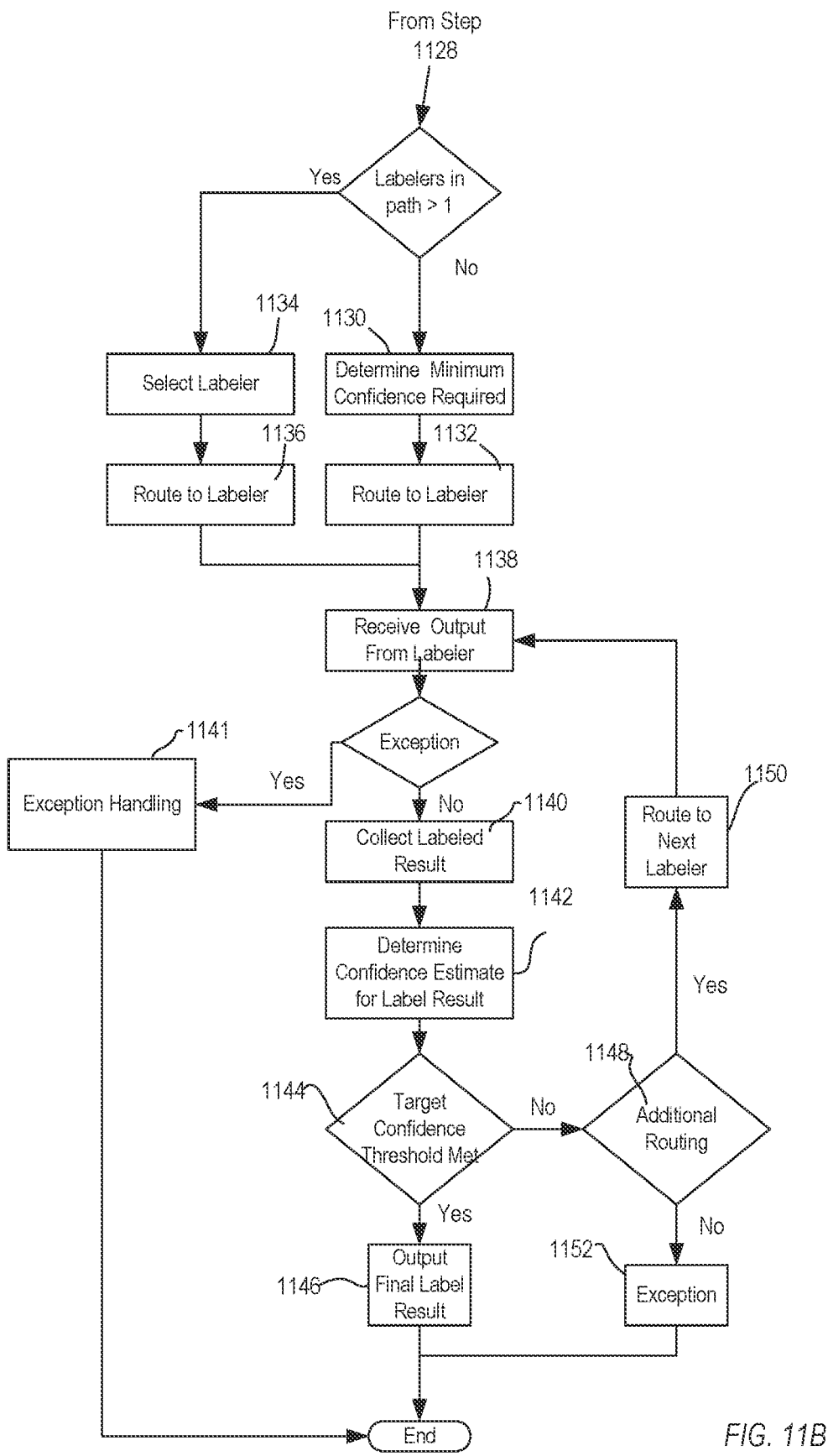

There may be more than one viable execution path through the constituent labelers and workflow orchestrator 710 may be required to make routing decisions. Workflow orchestrator 710 selects the labeler or sequence of labelers to which to route based on the constraints. FIG. 11A and FIG. 11B are a flow chart of one embodiment of dynamically determining a path through a set of constituent labelers. The steps of FIG. 11A and FIG. 11B may be embodied as computer-executable instructions on a non-transitory computer-readable medium. One or more steps of FIG. 11A and FIG. 11B may be implemented by a labeling platform. By way of example, but not limitation, one or more steps of FIG. 11A and FIG. 11B may be performed by workflow orchestrator 710 or QMS 750.

According to one embodiment, workflow orchestrator 710 receives a task comprising a labeling request with accompanying task information, such as a task type description with associated constraints (e.g., target confidence threshold, cost constraints (temporal and/or monetary) or other constraints).

At step 1102, workflow orchestrator 710 applies criteria to filter out labelers from consideration. Examples of filter criteria include, but are not limited to: task type description must match part or all of the request task description exactly; descriptors, if specified, must match according to Boolean logic specified for workflow configuration; pool size must be greater than or equal to the number of times that labeler has been called so far by the workflow orchestrator for the same labeling request (i.e., there must be at least one more labeler instance in the labeler's pool that has not already provided a result for the labeling request). If all the labelers are filtered out, as determined at step 1106, workflow orchestrator 710 may output an exception (step 1108).

If there are cost constraints (temporal, monetary or other cost) and/or confidence constraints, workflow orchestrator 710 performs a path search to find the optimal set of labelers (step 1114). For example, workflow orchestrator 710 determines a bounded number of candidate possible execution paths through the set of labelers. According to one embodiment, paths are generated and evaluated using a configurable A* or breadth first search with max depth, and an evaluation function is applied. Other path search algorithms can also be used.

For each node in the search, the accrued cost and accrued result confidence estimate (based on the contributions from labeler consultations in the path) are considered. For the first labeler in the execution path through the CDW, there may be no accrued cost or accrued confidence estimate. In other embodiments, an accrued cost and result confidence estimate may be provided to the CDW for a labeling request.

The evaluation function for each node in the search can be a configurable function of total path monetary cost, total path time, and end-point confidence (which can be estimated by QMS 750 for each path endpoint). For a path, the temporal costs associated with each labeler in a path can be used in the evaluation function to determine the estimated total path time and the monetary costs associated with each labeler in the path can be used in the evaluation function to determine the estimated total path monetary cost. As discussed above, the temporal costs and monetary costs may be expressed as statistical aggregates (mean and variance, 95% confidence interval range or other statistical aggregate). Thus, a statistical aggregate may be determined for the path as a whole.

Similarly, when considering each labeler in the search, any statistical aggregate (mean, median) or distribution (e.g., range or 95% confidence interval) can be used in the evaluation function to represent the confidence estimate for that labeler's position in the sequence of labelers consulted. For example, the labeler's score (which may be a statistical description derived from the scores of the labeler instances in that labelers pool) may be used to represent a confidence estimate for that labeler's position.

More particularly, each path endpoint can represent a specific path of labelers (that is, a sequence of labelers consulted) and QMS 750 estimates the a priori endpoint confidence for the path (step 1120) before the path is executed. QMS 750 estimates the a priori endpoint confidence based on the same confidence calculation it would use to calculate a confidence estimate for a result once the path is executed. The difference in estimating the a priori confidence of the path before the path is executed and determining a confidence estimate after the path is executed is that before, the workflow orchestrator uses the labeler scores (e.g., the confidence ranges of the individual labelers) as confidence estimates for the labelers (e.g., uses the mean/median or max/min, or other statistical description depending on how it is configured of the scores for the pool of instances) whereas after, the workflow orchestrator uses information about the specific labeler instance that performed the labeling. Thus, for example, QMS 750 may apply various methods of determining complex granular confidences and/or composite confidences as described above, using the scores of the constituent labelers to determine a confidence range for a path.

If the path meets the task constraints based on the estimated total path monetary cost, total path time, and end-point confidence, the path can be added to a set of viable paths (step 1120). Otherwise the path can be discarded (step 1122).

According to one embodiment, a path may be considered to meet the task constraints based on a set of configurable criteria. For example, according to one embodiment, a path may be considered to meet the task constraints if i) cost target, if specified, must be >=95% confidence interval determined for the path; ii) time target, if specified, must be >=95% confidence interval confidence determined for path; and iii) confidence target, if specified, must be within estimated confidence range or confidence interval determined for the path. Other rules may be applied. For example, the 95% confidence interval is merely provided as an example and other intervals may be used.

Figure 12A:
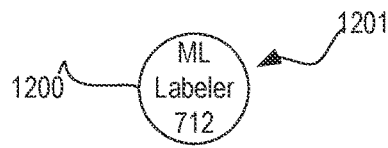
FIG. 12A is a diagrammatic representation of a single node path.

As illustrated in FIG. 12A, the path search can begin by evaluating single nodes as the first path step (e.g., evaluate node 1200 to evaluate a single node path 1201). In this case, the estimated total path monetary cost may be equal to the monetary cost of ML labeler 712, the total path time cost may be equal to the time cost of ML labeler 712, and the estimated end-point confidence may be equal to the score (e.g., confidence range) for ML labeler 712 for the task type for which the path is being determined. In one embodiment, path 1201 may be considered to meet the task constraints if i) cost target, if specified, is >=95% confidence interval determined for path 1201; ii) time target, if specified, is >=95% confidence interval confidence determined for path 1201; and iii) confidence target, if specified, is within estimated end-point confidence range or confidence interval determined for the path 1201. If path 1201 meets the constraints, path 1201 can be considered to be a viable (candidate) path. If path 1201 does not meet the constraints, path 1201 is not considered viable. Other rules may be applied. For example, the 95% confidence interval is merely provided as an example and other intervals may be used.

Figure 12B:
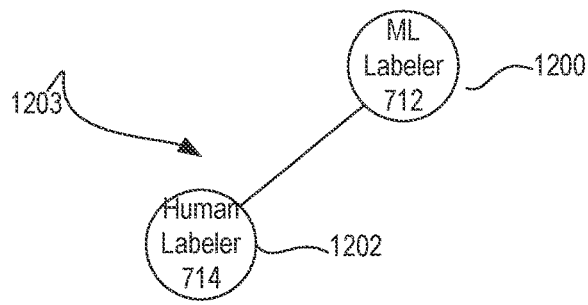
FIG. 12B is a diagrammatic representation of further searching a path through a CDW.

The path search can continue to search for viable paths. As illustrated in FIG. 12B, for example, the path search can add a node 1202 for a first consultation of human labeler 714 to create path 1203. In this case, QMS 750 estimates the total monetary cost of path 1203 by aggregating the monetary costs of ML labeler 712 and human labeler 714 and estimates the total time cost of path 1203 by aggregating the time costs of ML labeler 712 and human labeler 714. QMS 750 estimates the path end-point confidence by applying the appropriate confidence estimate calculation. For example, since human labeler 714 is a "blind" judgement labeler, QMS 750 could apply a blind granular confidence estimate using the score (e.g., confidence ranges) of ML labeler 712 and human labeler 714 to determine a confidence range for the overall path 1203. In one embodiment, path 1203 may be considered to meet the task constraints if i) cost target, if specified, is >=95% confidence interval determined for path 1203; ii) time target, if specified, is >=95% confidence interval confidence determined for path 1203; and iii) confidence target, if specified, is within estimated end-point confidence range or confidence interval determined for the path 1203. If path 1203 meets the constraints, path 1203 can be considered to be a viable path. If path 1203 does not meet the constraints, path 1203 is not considered viable. Other rules may be applied. For example, the 95% confidence interval is merely provided as an example and other intervals may be used.

Figure 12C:
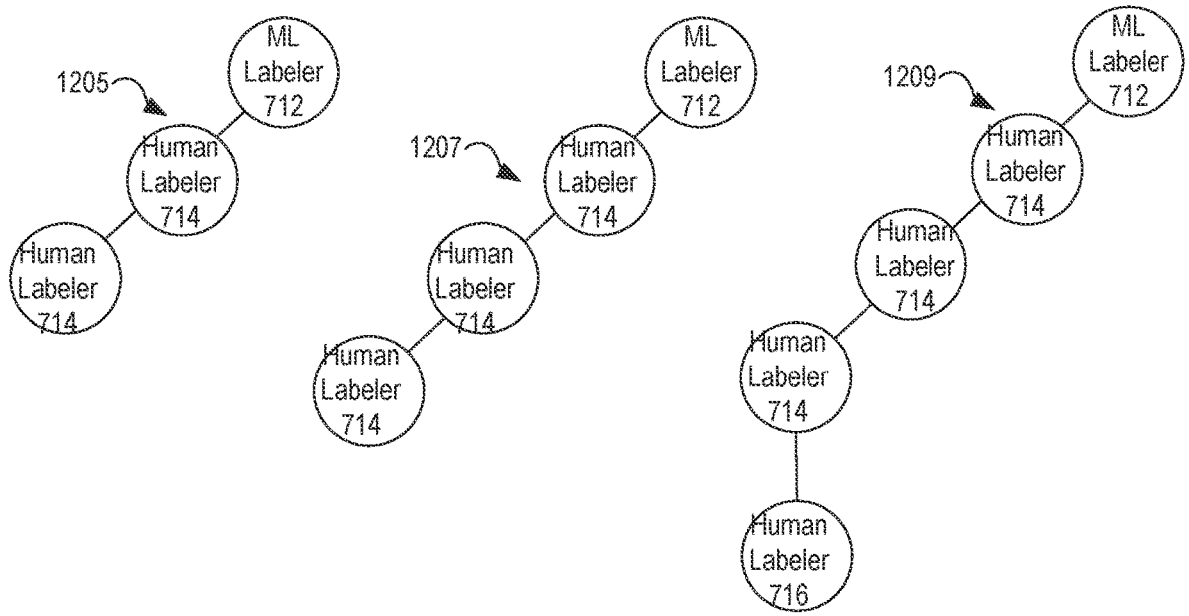
FIG. 12C is a diagrammatic representation of additional example paths through a CDW.
Figure 12C:
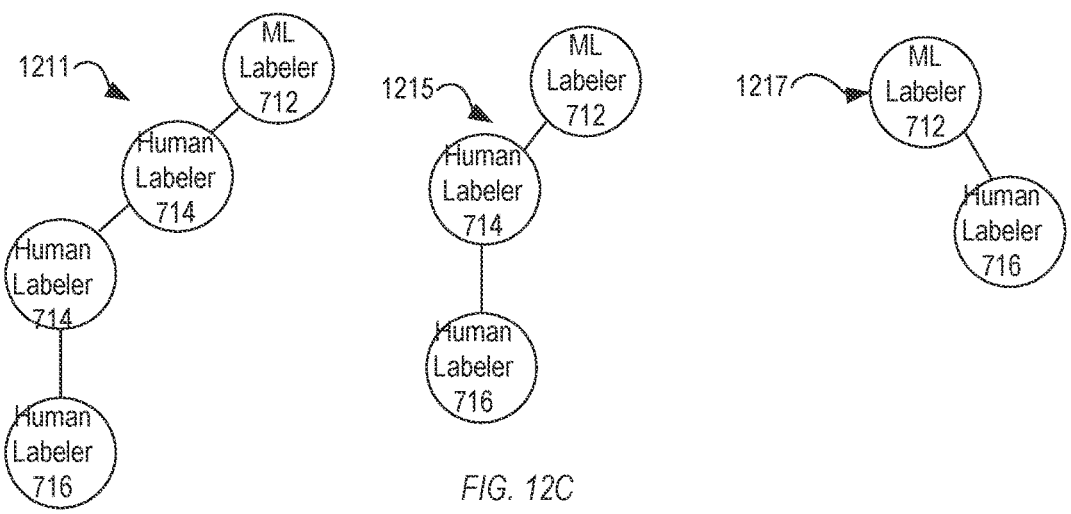

FIG. 12C illustrates some additional examples of paths, including path 1205 with human labeler 714 used twice (with different labeler instances), path 1207, path 1209, path 1211, path 1215, and path 1217.

In some embodiments, the search can be configured to stop when a max depth or cost is reached without finding a path that meets the constraints (FAILURE).

In some embodiments, the search can also stop when a single path is found that meets the constraints. In yet another embodiment, the path search can be stopped when some number of paths have been explored and workflow orchestrator 710 can pick the optimal path from the possibly multiple solutions found that meet the constraints.

If the search ends without finding a viable path, workflow orchestrator 710 can output an exception (step 1126). If at least one viable path is found, workflow orchestrator can select a path from the one or more viable paths (step 1128). If there are multiple viable paths, this selection may be random. In another embodiment, if there are one or more paths that meet the overall constraints, workflow orchestrator can optimize the search path according to various criteria. According to one embodiment, workflow orchestrator can optimize the path according to one or more of:

1) Cost optimized. At each branch in the search tree, select the next node in the path as the labeler with the least mean monetary cost, if there is a tie between labelers in a path randomly select from among this subset;
2) Time optimized. At each branch in the search tree, select the next node in the path as the labeler with the least mean time cost, if there is a tie between labelers in a path randomly select from among this subset;
3) Confidence optimized. At each branch in the search tree, select the next node in the path as the labeler with the highest minimum confidence estimate (e.g., the labeler with a score range with the highest minimum score) or highest mean confidence estimate (e.g., the labeler with the confidence range with the highest minimum score);
4) Combinations of these can be used by optimizing a set of confidence constraints for a range, then optimizing the subset for a different range on a different variable. This can all be specified in the configuration.

If the selected viable path includes only one labeler (one node) (as determined at step 1129), the minimum confidence required for the labeler in order to maintain viability of the planned path may be determined (step 1130). For example, workflow orchestrator 710 can query QMS 750 for the minimum confidence required for the labeler in order to maintain viability of the planned path (may be subset of the confidence range the labeler provides). According to one embodiment, QMS 750 back solves the confidence estimate for the labeler to determine the minimum confidence required. At step 1132, workflow orchestrator 710 sends the task to that labeler with a confidence constraint, the confidence constraint including the required minimum confidence determined by QMS 750.

At any point, if all remaining constraints and optimizations are satisfied by multiple labelers, then a random selection is made from these labelers. Workflow orchestrator 710 selects the first labeler in a selected path (step 1134) and sends the task to that labeler with or without a confidence constraint (step 1136).

Figure 13:
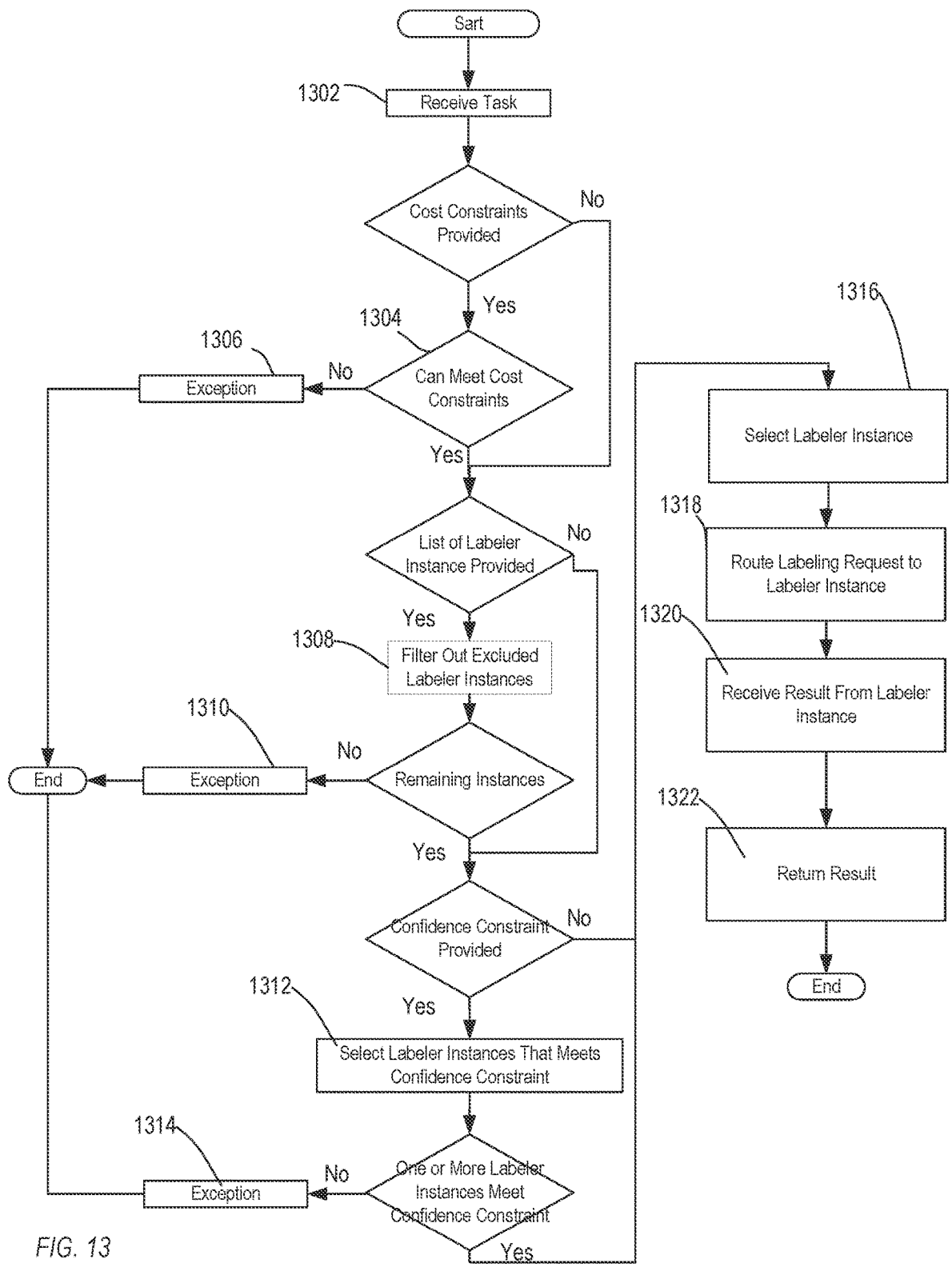
FIG. 13 is a flow chart of one embodiment of processing by a labeler.

At steps 1132 and 1136, workflow orchestrator 710 sends the selected labeler a labeling request, an instance identifier list for the labeler instances behind that labeler that have already executed the same labeling request (and therefore may be excluded from providing another answer), and a set of constraints, such as, but not limited to, a simple confidence estimate constraint (provided by the QMS 750 or from search path constraints), and a maximum time and cost to completion (from the task information or from search path constraints based on the value used to calculate total path time for a node). The constraints are conceptually an "SLA contract" for maximum time, maximum price, and minimum confidence allowed for the labeler. One embodiment of processing by a labeler is illustrated in FIG. 13.

At step 1138, workflow orchestrator 710 receives an output of the labeler. Workflow orchestrator collects labeled results corresponding to a task (or labeling request) (as illustrated by constituent labeler results 720) (step 1140). If the labeler returns an exception, workflow orchestrator 710 may implement exception handling (step 1141). In some embodiments, workflow orchestrator 710 outputs the exception and processing of the input request may end. In other embodiments, workflow orchestrator may continue processing the input request (e.g., by routing the labeling request to a next labeler).

According to one embodiment, workflow orchestrator 710 determines the confidence estimate for the label returned by the labeler (step 1142). In a particular embodiment, workflow orchestrator 710 calls the QMS 750 to calculate the confidence estimate for the label and QMS 750 uses, for example, a granular confidence approach. If the input request has already been processed by a labeler in the path, QMS 750 may use a complex granular confidence approach (e.g. probability formulas or logistic regression) based on the labeled results output by the labeler and prior labelers, previous accuracy assessments for the labeler instances, labeler instance scores, and/or self-reported confidence for all labeler instances consulted in the path thus far.

The workflow orchestrator 710 examines the result. Note that even if an individual labeler confidence constraint is provided to a labeler, the QMS-assessed confidence in the returned result may be lower than the individual labeler's a priori confidence estimate and lower than the constraint provided. For example, this may happen for ambiguous inputs when the labeler's (self-reported) certainty is taken into account for confidence estimates.

If the confidence estimate returned for the label by QMS 750 meets the confidence threshold target, as determined at step 1144, then a stopping condition has been reached, and workflow orchestrator 710 can return the labeled result, including the confidence determined by QMS 750 for the label (step 1146).

If the confidence estimate returned by QMS 750 does not meet the confidence threshold, workflow orchestrator 710 may determine if additional routing is available (step 1148). In some embodiments, workflow orchestrator 710 continues processing the labeling request using the path selected at step 1128 until the target confidence threshold is met or the path is exhausted. If the path is not complete, workflow orchestrator 710 routes the labeling request to the next labeler (step 1150). For example, if workflow orchestrator 710 selects path 1211 for processing a labeling request, workflow orchestrator 710 will continue routing the labeling request using path 1211 until the confidence threshold target is met or path 1211 is exhausted. If there are no remaining labelers in the selected path, workflow orchestrator 710 will output an exception (step 1152).

In another embodiment, workflow orchestrator 710 re-searches for possible paths after consultation with the prior labeler and thereby determines a new set of viable paths, each of which starts with the labelers consulted so far. The possible paths may be searched again using the remaining labelers in CDW 700. At this point, workflow orchestrator has more information about the task, the answers already given by labelers in the execution path, the confidence estimates in those answers, and the costs accrued by each labeler in processing the labeling request. Workflow orchestrator 710 can thus query QMS for scores conditioned on that answer, and determine viable paths given the accrued costs and confidence estimates in the answers so far. Thus, workflow orchestrator 710 can route low-confidence "results so far" differently from high-confidence "results so far".

For example, say workflow orchestrator 710 initially selects path 1201, but the confidence estimate for the result output by ML labeler 712 does not meet the threshold confidence, workflow orchestrator can perform a path search to find viable paths given the actual costs accrued by the prior nodes in the execution path—ML labeler 712 in this example—and the confidence estimate for the labeled result output by the prior node. As another example, say step 1148 occurs after executing the labeling request according to path 1203, then workflow orchestrator can perform a path search to find viable paths given the actual costs accrued by the prior nodes in the execution path—ML labeler 712 and ML labeler 712 in this example—and the confidence estimate for the labeled results output by ML labeler 712 and human labeler 714.

Thus, in performing steps 1148 and 1150, workflow orchestrator 710 can essentially repeat steps 1104-1136 starting from the last node used in the path so far and considered the accrued costs and result confidence estimate based on one or more prior labeler consultations. If the search fails (e.g., due to exceeded time/cost constraints or failed escalating confidence requirements (for ambiguous cases)), workflow orchestrator 710 will output an exception (step 1154).

In some (early bootstrapping, crowd training) workflow configurations where, for example, the confidence models are not yet stable for given labelers, if the assessed confidence by QMS 750 in the result returned by the labeler is lower than the target specified by the workflow orchestrator 710 (by some configurable threshold), then the workflow orchestrator 710 can be configured to throw away the result and retry with a different labeler instance (escalate confidence constraints and then timeout with exception based on configurable number of retries).

FIG. 11A and FIG. 11B are provided by of example and not limitation. Various steps may be repeated, steps may be performed in different orders, steps omitted, and additional or alternative steps performed.

FIG. 13 is a flow chart illustrating one embodiment a method of a labeler processing a task (labeling request). The steps of FIG. 13 may be embodied as computer-executable instructions on a non-transitory computer-readable medium. One or more steps of FIG. 13 may be implemented by a labeling platform. By way of example, but not limitation, one or more steps of FIG. 13 may be performed by a labeler.

At step 1302, a labeler (e.g., labeler 712, 714, 716) receives a task from workflow orchestrator 710. The task may include cost (e.g., maximum time, maximum price) or confidence constraints (e.g., an individual labeler confidence target). If cost constraints are provided, the labeler determines if it can complete the task in the cost constraints (step 1304) and, if not, returns an exception (step 1306). In some embodiments, all cost estimates in a particular cost dimension (e.g., monetary, time) for labeler instances within a single labeler are uniform (e.g., each labeler instance behind a labeler is assumed to have the same monetary cost estimate and each labeler instance behind a labeler is assumed to have the same time cost estimate). In other embodiments, different labeler instances may have different associated costs and the labeler filters out labeler instances that are estimated to not meet the cost constraints. If there are no remaining labeler instances to handle the task, the labeler returns an exception (step 1306).

If a list of labeler instances in the labeler's pool that have processed the labeling request is provided, the labeler filters out the labeler instances that are excluded from processing the task based on the labeler instance list (step 1308). If there are no remaining labeler instances to handle the task, the labeler returns an exception (step 1310).

If an individual labeler confidence constraint is provided, the labeler determines, from the remaining labeler instances, a subset of labeler instances that are estimated to meet the individual labeler confidence constraint (step 1312). As will be appreciated from the discussion above, the selected path of which the labeler is a part is calculated to make the overall label result confidence meet the configured confidence threshold. An individual labeler is selected to be a part of the path based on its anticipated contribution to that overall confidence. Its anticipated impact is based on quality metrics provided by QMS 750.

As the path is executed, the confidence constraint on the remaining labelers will be updated to reflect how much confidence the next (and subsequent) labelers have to provide to get the overall confidence a desired value. If the first labeler provides a very confident answer, then less is needed from the second to get the overall confidence to the right point. The individual labeler confidence constraint is specific to what is needed from that labeler for its part of the path and is calculated by the QMS 750. The individual labeler confidence constraint can be represented as a simple confidence estimate target.

According to one embodiment, the labeler queries QMS 750 for the subset of labeler instances of that labeler that have a priori confidence estimates for the label that meet the confidence constraint for the labeler's part in the overall path (or for larger pools, a random subset of n labeler instances that are predicted to meet the confidence constraint). If there is no labeler instance that meets the individual labeler confidence constraint, the labeler may return an exception (step 1314).

At step 1316, the labeler selects a labeler instance for the subset of labeler instances that are estimated meet the constraints to handle the task. According to one embodiment, this selection is random. In another embodiment, for example, the labeler selects the labeler instance based on load-balancing concerns.

The labeler sends the task to the labeler instance (step 1318) and receives the result from the labeler instance (step 1320). The labeler returns the result provided by the labeler instance to workflow orchestrator 710 (including the info about which labeler instance did the task, any self-assessed confidence provided by the labeler instance) (step 1322).

FIG. 13 provided by of example and not limitation. Various steps may be repeated, steps may be performed in different orders, steps omitted, and additional or alternative steps performed.

Figure 14:
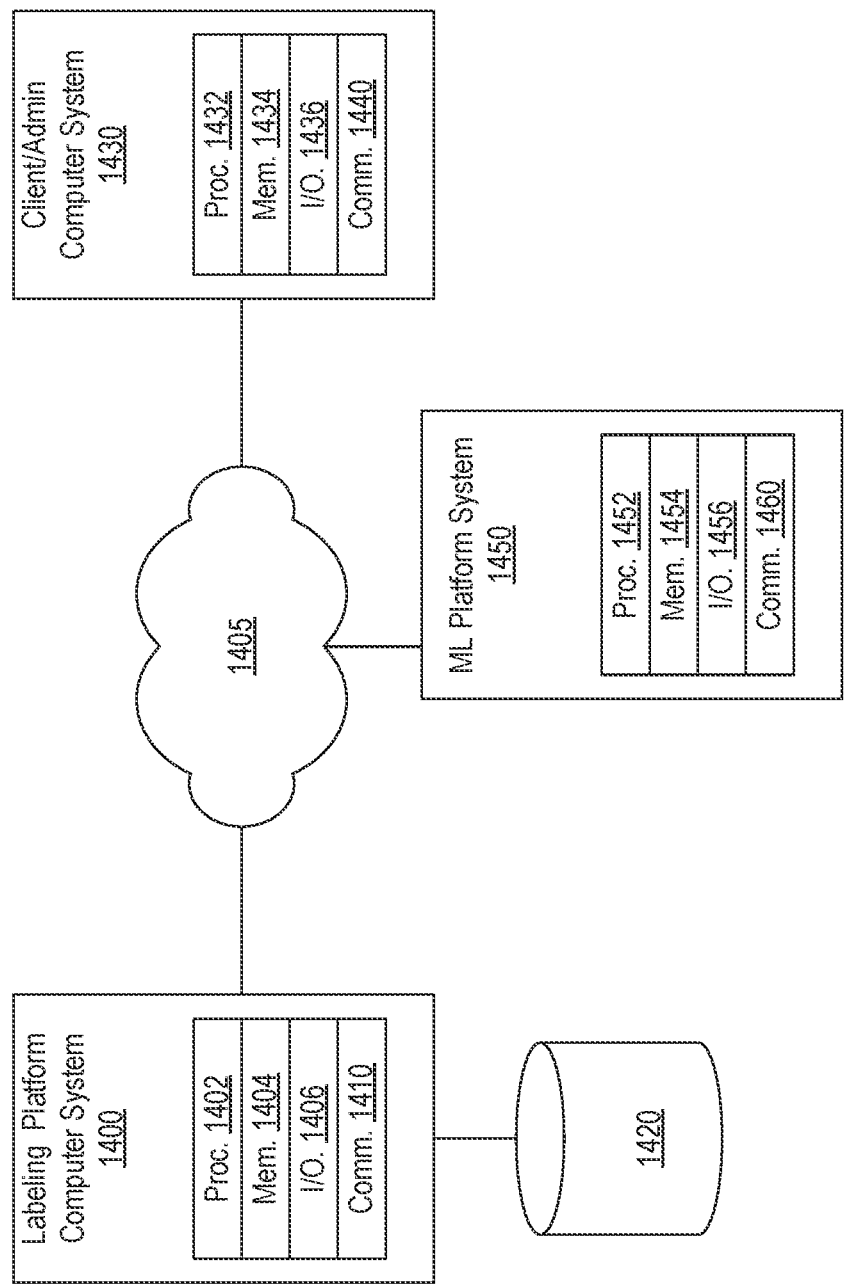
FIG. 14 is a diagrammatic representation of an example network environment.

FIG. 14 is a diagrammatic representation of one embodiment of a distributed network computing environment where embodiments disclosed herein can be implemented. The computing environment includes a labeling platform system 1400, one or more second computer systems 1430 connected to a network 1405 (e.g., a local area network (LAN), a wide area network (WAN) such as the Internet, mobile network, or other type of network or combination thereof). Network 1405 may represent a combination of wired and wireless networks that network computing environment may utilize for various types of network communications.

Labeling platform system 1400 may include, for example, a computer processor 1402 and associated memory 1404. Computer processor 1402 may be an integrated circuit for processing instructions. For example, processor 1402 may comprise one or more cores or micro-cores of a processor. Memory 1404 may include volatile memory, non-volatile memory, semi-volatile memory, or a combination thereof. Memory 1404, for example, may include RAM, ROM, flash memory, a hard disk drive, a solid-state drive, an optical storage medium (e.g., CD-ROM), or other computer readable memory or combination thereof. Memory 1404 may implement a storage hierarchy that includes cache memory, primary memory, or secondary memory. In some embodiments, memory 1404 may include storage space on a data storage array. Labeling platform system 1400 may also include input/output ("I/O") devices 1406, such as a keyboard, monitor, printer, electronic pointing device (e.g., mouse, trackball, stylus, etc.), or the like. Labeling platform system 1400 may also include a communication interface 1410, such as a network interface card, to interface with network 1405.

Memory 1404 may store instructions executable by processor 1402. For example, memory 1404 may include instructions executable to implement a labeling platform, such as labeling platform 104. In some embodiments, memory 1404 may include instructions to implement a confidence driven workflow and QMS. Labeling platform system 1400 may represent a plurality of servers. In some embodiments, labeling platform system 1400 may represent a cloud computing system.

Labeling platform system 1400 may include a data store 1420 that stores data usable by the labeling platform. According to one embodiment, data store 1420 may comprise one or more databases, one or more file systems or a combination thereof. In some embodiments, data store 1420 may be a portion of memory 1404.

Second computer system 1430 may include, for example, a computer processor 1432 and associated memory 1434. Computer processor 1432 may be an integrated circuit for processing instructions. For example, processor 1432 may comprise one or more cores or micro-cores of a processor. Memory 1434 may include volatile memory, non-volatile memory, semi-volatile memory, or a combination thereof. Memory 1434, for example, may include RAM, ROM, flash memory, a hard disk drive, a solid-state drive, an optical storage medium (e.g., CD-ROM), or other computer readable memory or combination thereof. Memory 1434 may implement a storage hierarchy that includes cache memory, primary memory, or secondary memory. In some embodiments, memory 1434 may include storage space on a data storage array. Second computer system 1430 may also I/O devices 1436. Second computer system 1430 may also include a communication interface 1440, such as a network interface card, to interface with network 1405.

Memory 1434 may store instructions executable by processor 1432. For example, memory 1434 may include one or more programs to implement a human labeler computer system 140 or a client computer system 150. While only one computer system 1430 is illustrated, there may be a large number of second computer systems 1430 connected to labeling platform system 1400.

Labeling platform system 1400 may also be coupled to an ML platform system 1450. ML platform system 1450 may include, for example, a computer processor 1452 and associated memory 1454. Computer processor 1452 may be an integrated circuit for processing instructions. For example, processor 1452 may comprise one or more cores or micro-cores of a processor. Memory 1454 may include volatile memory, non-volatile memory, semi-volatile memory, or a combination thereof. Memory 1454, for example, may include RAM, ROM, flash memory, a hard disk drive, a solid-state drive, an optical storage medium (e.g., CD-ROM), or other computer readable memory or combination thereof. Memory 1454 may implement a storage hierarchy that includes cache memory, primary memory, or secondary memory. In some embodiments, memory 1454 may include storage space on a data storage array. ML platform system 1450 may also include input/output ("I/O") devices 1456, such as a keyboard, monitor, printer, electronic pointing device (e.g., mouse, trackball, stylus, etc.), or the like. ML platform system 1450 may also include a communication interface 1460, such as a network interface card, to interface with network 1405.

Memory 1454 may store instructions executable by processor 1452. For example, memory 1454 may include instructions executable to implement an ML model platform that allow for the training or deployment of ML models. ML platform system 1450 may represent a plurality of servers. In some embodiments, ML platform system 1450 may represent a cloud computing system. While only one ML platform system 1450 is illustrated, labeling platform system may utilize any number of ML platform systems.

Although the invention has been described with respect to specific embodiments thereof, these embodiments are merely illustrative, and not restrictive of the invention. The description herein is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Those skilled in the relevant art will appreciate that embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols. Any particular routine can execute on a single computer processing device or multiple computer processing devices, a single computer processor or multiple computer processors. Data may be stored in a single storage medium or distributed through multiple storage mediums. In some embodiments, data may be stored in multiple databases, multiple filesystems, or a combination thereof.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

What is claimed is:

1. A computer program product comprising a non-transitory, computer-readable medium storing thereon a set of computer-executable instructions, the set of computer-executable instructions comprising instructions for:
   providing a confidence-driven workflow (CDW) comprising a set of labelers, each labeler in the set of labelers comprising executable code and having a dynamically modeled confidence range;
   dynamically determining an execution path for processing a labeling request to label a data item, wherein dynamically determining the execution path comprises:
      dynamically determining a bounded number of candidate paths through the set of labelers using dynamically calculated cost and confidence metrics for the labelers in the set of labelers to estimate a probability of each candidate path to satisfy a set of constraints on cost and final result confidence;
      selecting a candidate path from the candidate paths as a selected path; and
   executing a next labeler consultation according to the selected path to label the data item.

2. The computer program product of claim 1, wherein the set of computer-executable instructions further comprises instructions for:
   continually monitoring and scoring a plurality of labeler instances to generate labeler instance scores for the plurality of labeler instances, wherein scoring a labeler instance comprises determining an accuracy of the labeler instance based on a correctness of a set labeled results produced by the labeler instance; and
   updating the dynamically modeled confidence range of each labeler from the set of labelers, wherein updating the dynamically modeled confidence range for each labeler from set of labelers comprises:
      determining a set of labeler instance scores associated with a pool of labeler instances represented by each labeler from the set of labelers; and
      for each labeler from the set of labelers, aggregating the set of labeler instance scores associated with the pool of labeler instances represented by that labeler to generate the dynamically modeled confidence range for that labeler.

3. The computer program product of claim 1, wherein each candidate path from the bounded number of candidate paths has an associated path cost and an associated path confidence and wherein the selected path is selected to optimize the associated path cost and meet a target confidence threshold.

4. The computer program product of claim 1, wherein the bounded number of candidate paths through the set of labelers is determined based on an accrued cost and a result confidence estimate based on one or more prior labeler consultations in the execution path.

5. The computer program product of claim 1, wherein the set of computer-executable instructions further comprise instructions for:
receiving a labeled result based on executing the next labeler consultation; and
determining a confidence estimate for the labeled result.

6. The computer program product of claim 5, wherein the set of computer-executable instructions further comprise instructions for:
based on a determination that the confidence estimate for the labeled result meets a target confidence threshold, outputting the labeled result as a final result for the CDW.

7. The computer program product of claim 6, wherein the set of computer-executable instructions further comprise instructions for:
based on a determination that the confidence estimate for the labeled result does not meet the target confidence threshold, performing at least one of:
routing the labeling request to a next labeler from the set of labelers according to the selected path; or
reporting an exception that the labeling request cannot be completed within the set of constraints on cost and final result confidence.

8. The computer program product of claim 6, wherein the set of computer-executable instructions further comprise instructions for:
based on a determination that the confidence estimate for the labeled result does not meet the target confidence threshold:
dynamically determining a new set of candidate paths;
selecting a first candidate path from the new set of candidate paths as a new selected path based on the first candidate path minimizing a total path cost; and
routing the labeling request to a next labeler from the set of labelers according to the new selected path.

9. The computer program product of claim 1, wherein each labeler in the set of labelers represents one or more labeler instances from a plurality of labeler instances and wherein the set of computer-executable instructions further comprises instructions for:
determining for each labeler instance in the plurality of labeler instances a score for that labeler instance that corresponds to a probability that the labeler instance will produce an accurate label; and
determining the dynamically modeled confidence range for each labeler in the set of labelers as a statistical description derived from the scores of the one or more labeler instances represented by that labeler.

10. The computer program product of claim 9, wherein each labeler instance in the plurality of labeler instances has an associated labeler instance cost and wherein each labeler has an associated labeler cost, wherein the associated labeler cost for each labeler is a statistical description of the associated labeler instance costs of the one or more labeler instances represented by that labeler.

11. The computer program product of claim 9, wherein the set of computer-executable instructions further comprises instructions for determining confidence estimates for labeled results produced by each labeler of the set of labelers based on the scores determined for the one or more labeler instances represented by that labeler.

12. The computer program product of claim 11, wherein at least one labeler in the set of labelers comprises instructions for:
receiving an individual labeler confidence constraint for the labeling request;
determining that a labeler instance of the one or more labeler instances represented by at least one labeler has a score that meets the individual labeler confidence constraint; and
routing the labeling request to the labeler instance.

13. A computer-implemented method for data labeling:
providing a confidence-driven workflow (CDW) comprising a set of labelers, each labeler in the set of labelers comprising executable code and having a dynamically modeled confidence range;
dynamically determining an execution path for processing a labeling request to label a data item, wherein dynamically determining the execution path comprises:
dynamically determining a bounded number of candidate paths through the set of labelers using dynamically calculated cost and confidence metrics for the labelers in the set of labelers to estimate a probability of each candidate path to satisfy a set of constraints on cost and final result confidence;
selecting a candidate path from the candidate paths as a selected path; and
executing a next labeler consultation according to the selected path to label the data item.

14. The computer-implemented method of claim 13, further comprising
continually monitoring and scoring a plurality of labeler instances to generate labeler instance scores for the plurality of labeler instances, wherein scoring a labeler instance comprises determining an accuracy of the labeler instance based on a correctness of a set labeled results produced by the labeler instance; and
updating the dynamically modeled confidence range of each labeler from the set of labelers, wherein updating the dynamically modeled confidence range of each labeler from the set of labelers comprises:
determining a set of labeler instance scores associated with a pool of labeler instances represented by each labeler from the set of labelers; and
for each labeler from the set of labelers, aggregating the set of labeler instance scores associated with the pool of labeler instances represented by that labeler to generate the dynamically modeled confidence range for that labeler.

15. The computer-implemented method of claim 13, wherein each candidate path from the bounded number of candidate paths has an associated path cost and an associated path confidence and wherein the selected path is selected to optimize the associated path cost and meet a target confidence threshold.

16. The computer-implemented method of claim 13, wherein the bounded number of candidate paths through the set of labelers is determined based on an accrued cost and a result confidence estimate based on one or more prior labeler consultations in the execution path.

17. The computer-implemented method of claim 13, further comprising:
receiving a labeled result based on executing the next labeler consultation; and
determining a confidence estimate for the labeled result.

18. The computer-implemented method of claim 17, further comprising:
based on a determination that the confidence estimate for the labeled result meets a target confidence threshold, outputting the labeled result as a final result for the CDW.

19. The computer-implemented method of claim 17, further comprising:

based on a determination that the confidence estimate for the labeled result does not meet a target confidence threshold, performing at least one of:

routing the labeling request to a next labeler from the set of labelers according to the selected path; or reporting an exception that the labeling request cannot be completed within the a set of constraints on cost and final result confidence.

20. The computer-implemented method of claim 17, further comprising:

based on a determination that the confidence estimate for the labeled result does not meet a target confidence threshold:

dynamically determining a new set of candidate paths;

selecting a first candidate path from the new set of candidate paths as a new selected path based on the first candidate path minimizing a total path cost; and routing the labeling request to a next labeler from the set of labelers according to the new selected path.

21. The computer-implemented method of claim 13, further comprising:

for each labeler instance in a plurality of labeler instances, determining a score for that labeler instance that corresponds to a probability that the labeler instance will produce an accurate label, wherein each labeler in the set of labelers represents one or more labeler instances from the plurality of labeler instances; and determining the dynamically modeled confidence range for each labeler in the set of labelers as a statistical description derived from the scores of the one or more labeler instances represented by that labeler.

22. The computer-implemented method of claim 21, wherein each labeler instance in the plurality of labeler instances has an associated labeler instance cost and wherein each labeler has an associated labeler cost, wherein the associated labeler cost for each labeler is a statistical description of the associated labeler instance costs of the one or more labeler instances represented by that labeler.

23. The computer-implemented method of claim 21, further comprising determining confidence estimates for labeled results produced by each labeler of the set of labelers based on the scores determined for the one or more labeler instances represented by that labeler.

24. The computer-implemented method of claim 23, further comprising a selected labeler from the set of labelers performing:

receiving an individual labeler confidence constraint for the labeling request;

determining that a labeler instance of the one or more labeler instances represented by the selected labeler has a score that meets the individual labeler confidence constraint; and routing the labeling request to the labeler instance.

* * * * *